(12) United States Patent
Rosenhaft et al.

(10) Patent No.: US 8,635,164 B2
(45) Date of Patent: *Jan. 21, 2014

(54) TELECOMMUNICATIONS INITIATED INTERNET LINK SYSTEM

(75) Inventors: Matthew Rosenhaft, Atlanta, GA (US); Barry Brager, Smyrna, GA (US)

(73) Assignee: Starpound Corporation, Inc., Smyrna, GA (US)

( * ) Notice: Subject to any disclaimer, the term of this patent is extended or adjusted under 35 U.S.C. 154(b) by 71 days.

This patent is subject to a terminal disclaimer.

(21) Appl. No.: 13/353,668

(22) Filed: Jan. 19, 2012

(65) Prior Publication Data

US 2012/0115448 A1 May 10, 2012

Related U.S. Application Data

(63) Continuation of application No. 13/299,695, filed on Nov. 18, 2011, now Pat. No. 8,296,241, which is a continuation of application No. 12/983,378, filed on Jan. 3, 2011, now Pat. No. 8,073,784, which is a continuation of application No. 11/320,932, filed on Dec. 29, 2005, now Pat. No. 7,865,447, which is a continuation of application No. 10/037,378, filed on Oct. 23, 2001, now Pat. No. 6,990,472.

(60) Provisional application No. 60/265,760, filed on Feb. 1, 2001, provisional application No. 60/242,511, filed on Oct. 23, 2000.

(51) Int. Cl.
*G06Q 20/00* (2012.01)

(52) U.S. Cl.
USPC .......................................... 705/64; 455/3.03

(58) Field of Classification Search
USPC ................ 705/14, 16–18, 26–27, 42, 64–79; 707/999; 709/201–203, 217–219; 455/3, 413–415
See application file for complete search history.

(56) References Cited

U.S. PATENT DOCUMENTS 5,216,703 A 6/1993 Roy
5,867,780 A 2/1999 Malackowski et al.
(Continued)

FOREIGN PATENT DOCUMENTS

EP 0 780 802 A2 6/1997
EP 0 812 120 A2 12/1997
(Continued)

OTHER PUBLICATIONS

Yuzhang Li, Tan YW, Fangchun Yang, Junliang Chen, Personal Service really putting the telephone users in the driver's seats, 157-163.

(Continued)

*Primary Examiner* — Mary Cheung
(74) *Attorney, Agent, or Firm* — Michael J. Mehrman; Mehrman Law Office

(57) ABSTRACT

A system for providing a wide range of telecommunications initiated data fulfillment services in which a multi-function code, such as "*#" (star, pound), input into an originating telecommunications device, such as a wireless telephone, triggers the treatment of the input sequence as a multi-function code service request rather than a dialed directory number. The multi-function code is followed by an input data string to complete the multi-function code service request, which the user typically enters into the telecommunications device just like a conventional telephone call, except that the input string begins with the multi-function code. The telecommunications system recognizes the multi-function code as a trigger, and in response takes one or more date fulfillment actions, such delivering a response message to the initiating telecommunications device containing one or more Internet links to webpages associated with the dialed input data string.

20 Claims, 12 Drawing Sheets

(56) References Cited

U.S. PATENT DOCUMENTS

| | | | |
|---|---|---|---|
| 5,963,452 | A | 10/1999 | Etoh et al. |
| 6,029,065 | A | 2/2000 | Shah |
| 6,035,189 | A | 3/2000 | Ali-Vehmas et al. |
| 6,056,194 | A | 5/2000 | Kolls |
| 6,122,501 | A | 9/2000 | Gallant |
| 6,181,935 | B1 | 1/2001 | Gossman et al. |
| 6,411,803 | B1 | 6/2002 | Malackowski et al. |
| 6,418,441 | B1 * | 7/2002 | Call ................................ 705/23 |
| 6,560,456 | B1 | 5/2003 | Lothia |
| 6,763,336 | B1 | 7/2004 | Kolls |
| 6,990,472 | B2 | 1/2006 | Rosenhaft et al. |
| 2003/0036376 | A1 | 2/2003 | Annan et al. |

FOREIGN PATENT DOCUMENTS

| | | |
|---|---|---|
| EP | 0 848 360 A1 | 6/1998 |
| EP | 0 812 120 A3 | 5/1999 |
| JP | 07054226 | 9/1996 |
| WO | WO/98/00987 | 1/1998 |
| WO | WO9800987 | 1/1998 |
| WO | WO 98/34203 | 8/1998 |
| WO | WO 99/33034 | 7/1999 |
| WO | WO/00/49795 | 8/2000 |
| WO | WO 00/49795 A1 | 8/2000 |

OTHER PUBLICATIONS

L. R. Bowyer, R. B. Robrock, Intelligent Network Services for Data Customers.
Ram P. Batnl, IEEE in '96 Workshop; Apr. 21-24, 1996.
S. Y. Yeh, Global Intelligent Networking: Architectures, Services and Design Principles, 455-460.
P. H. Vapheas, B.A. Polonsky, A.M. Gopin, R.J. Wojcik, Advanced Intelligent Network: Evolution, 1991, 941-947.
Robert Epley; BETB Ann Polonsky, Stanley Yeh, Advanced Intelligent Network Services Evolution, 1990, 0197-0205.
U.S. Appl. No. 60/240,642, filed Oct. 16, 2000, Annan, David B.
Beaudry et al., "Global System for Mobile Communications" Telesis, n 94, Jul. 1992 pp. 52-69, ISSN:0040-2710.
Toward Definition of the SPIRITS Architecture: SPIRITS Interfaces L. Slutsman—AT&T Labs 4 pages, Mar. 2000.
NEC Implementation for ICW Service NEC America, Inc. 28 pages, Mar. 2000.
Toward Definition of the Protocol for PSTN-initiated Services Supported by PSTN/Internet Interworking I. Faynberb, H. Lu, M. Weissman—Lucent Technologies: L. Slutsman—AT&T, Mar. 2000.
Request for Comments 3298—Memo I Fayberg, Editor-Lucent Technologies; J. Gato—Vodaphone; H. Lucent Technologies; L. Slutsman—AT&T Aug. 2002; 15 pages.
Request for Comments 1122 R. Braden, Editor Oct. 1989: 116 pages.

* cited by examiner

TELECOMMUNICATIONS INITIATED INTERNET LINK SYSTEM

REFERENCE TO RELATED APPLICATIONS

This application is a continuation application claiming priority to U.S. patent application Ser. No. 13/299,695, now U.S. Pat. No. 8,296,241 and U.S. patent application Ser. No. 12/983,378, now U.S. Pat. No. 8,073,784; which are continuation applications claiming priority to U.S. patent application Ser. No. 11/320,932, now U.S. Pat. No. 7,865,447, which is a continuation application claiming priority to U.S. patent application Ser. No. 10/037,378, now U.S. Pat. No. 6,990,472 which claims priority to commonly owned U.S. Provisional Patent Applications 60/265,760 filed Feb. 1, 2001 and 60/242,511 filed Oct. 23, 2000, which are all incorporated herein by reference.

TECHNICAL FIELD

This invention relates generally to a telecommunications initiated data fulfillment system in which a telecommunications input sequence including a multi-function code sequence, such as a "star-pound" (i.e., *#) sequence, initiates an automatic data fulfillment service. The system can be used for a wide variety of applications including but not limited to mobile vending, mobile data delivery, mobile Internet access, mobile WAP communications, on-demand delivery of promotional information, and many others.

BACKGROUND OF THE INVENTION

Due to the communications boom brought on by the popularization of wireless communication devices and the Internet, there presently exists an increasing opportunity for telecommunications initiated services involving these increasingly prominent media. However, the configuration and operation of the existing telephone networks, wireless data networks, and the Internet inhibits the implementation of many new services that would rely on the integrated operation of these systems. Therefore, there presently exists an opportunity for improving the integration of the telecommunications system, the wireless data system, and the Internet to provide a wide range of new services that can be conveniently and cost effectively provided through these media.

SUMMARY OF THE INVENTION

The present invention meets the needs described above in a system for providing a wide range of telecommunications initiated data fulfillment services in which a multi-function code, such as "#" (star, pound), input into an originating telecommunications device, such as a conventional land-line or wireless telephone, triggers the treatment of the input telephone sequence as a multi-function code service request rather than a dialed directory number. The multi-function code is followed by an input data string to complete the multi-function code service request, which the user typically enters into the telecommunications device just like a conventional telephone call, except that the input string begins with the multi-function code (e.g., *#).

The telecommunications system recognizes the multi-function code as a trigger, and in response takes one or more actions in response to the trigger, such as automatically terminating the call to an announcement and routing a data message to a data fulfillment center. This data message typically includes the multi-function code service request and data string input by the customer along with identifying information for the initiating telecommunications device, such as the directory number assigned to the originating telecommunications device. The data message may include location information pertaining to the originating telecommunications device, such as information identifying the originating MTSO and cell tower. The message is typically transmitted to the data fulfillment center using the telecommunications system's signaling system, such as the SS7 signaling system currently deployed for most land-based telephone systems, or the X-25 signaling system currently deployed for most mobile telephone systems in the United States and Canada. Analogous signaling systems are deployed in telecommunications systems worldwide.

The data fulfillment center responds to the message by implementing a response action indicated by the multi-function code service request. For example, the data fulfillment center may respond by transmitting a message over a wireless data network or the Internet to implement a service, such as activation of a vending machine, remote control of device, delivery of a message over the Internet, delivery of a message over a wireless data network, initiation of an interactive Internet session with the originating device, or a wide range of other services. In addition, a charge for this service, if appropriate, may be automatically charged to an account associated with the originating telecommunications device, which may be billed separately or incorporated on the user's conventional monthly telecommunications invoice. Those skilled in the art will appreciate that the range of telecommunications initiated services that may be implemented in this manner is virtually limitless, and many different services will become apparent once the fundamental principles of the invention are understood.

Generally described, the invention includes a method for implementing a telecommunications initiated data fulfillment service. A telecommunications switch receives a communication from a telecommunication device comprising an input sequence including a multi-function key sequence. The telecommunications switch recognizes the multi-function key sequence as a trigger code and identifies an identification code associated with the telecommunication device, such as the directory number, MIN or EIN assigned to the telecommunication device. In response to the detected trigger event, the telecommunications switch looks up a pre-defined data address associated with the input sequence, the identification code, or a combination of the input sequence and the identification code. The telecommunications switch then assembles a data message associated with the input sequence, the identification code, or a combination of these items, and transmits the data message to the data address, which is also associated with a data fulfillment platform. The data fulfillment platform associated with the data address then implements an appropriate response action in response to the data message.

Typically, the data message includes at least the input sequence and the identification code associated with telecommunication device, and may also include location information associated with the originating telecommunications device, such as information identifying the MTOS and cell tower where the multi-function code service request was initially received. In addition, the data address to which the message is sent is typically associated with a data fulfillment center or Internet service provider operated by a provider of the telecommunications initiated data fulfillment service. This enables the service provider to respond to the message by implementing the appropriate telecommunications initiated data fulfillment service, such as activating a vending machine and charging an account associated with the originating telecommunications device for the delivered product, sending an e-mail to an address associated with the originating telecommunications device, remotely controlling a device, initiating an interactive Internet session with the originating telecommunications device, or performing any other suitable service.

In a mobile vending application, for example, the identification code may be used to identify an account associated with the telecommunications device, and the data fulfillment center may remotely activate the vending machine and charge a cost associated with the data message to the account associated with the telecommunications device. In particular, the data fulfillment center may identify a product code from a pre-defined set of digits in the input sequence; and may activate the vending device to deliver a product associated with the product code in response to the data message. To implement security, the data fulfillment center may also look up a pre-defined PIN associated with the telecommunications device, identify a PIN-sequence from a predefined set of digits in the input sequence, and compare the personal identification number to the PIN-sequence.

In addition, the telecommunications switch typically delivers an audio or data response to the telecommunications device indicating that the multi-function code service request has been received. The telecommunications switch then discontinues the communication, which frees the originating telecommunications device to receive an incoming data or telecommunications message associated with the requested data fulfillment service. For example, the telecommunications device may receive an incoming wireless data network communication, telephone call, or e-mail message as part of the data fulfillment service. In one alternative, the input sequence includes a directory number associated with an Internet site, and the data message initiates an Internet session between the telecommunications device and the Internet site. In this alternative, the telecommunications switch may forward the communication to a platform operated by an Internet service provider, and an incoming the wireless data network communication may initiate an interactive Internet session with the telecommunications device. In addition, the Internet service provider may automatically link the telecommunications device to the Internet site associated with the directory number included in the input sequence at the onset of the Internet session.

The data fulfillment center may also receive location data associated with the telecommunications device, and customize an action taken in response to the data message based on the location information. For example, the location data may indicate the MTSO and cell tower that initially received the multi-function code service request from the telecommunications device, and the data fulfillment center may customize its response by sending a mobile vending activation message to a vending machine located in the coverage area of the identified cell tower. This feature advantageously allows reuse of the vending codes in multiple locations served by different cell towers.

The data fulfillment center may also look up customer profile data corresponding to the identification code associated with the telecommunications device, and implement a response in accordance with this profile. For example, the customer profile may implement spending limits, location use limits, alternative addresses for routing responses, and so forth. Typically, the customer profile may be altered by the user, for example through Internet access. For this reason, the pre-defined data address may be a user-defined portion of the customer profile data. The data fulfillment center may also detect that the telecommunications device does not correspond to a subscriber of the telecommunications initiated data fulfillment service, and automatically link the telecommunications device to a platform configured to register the user of the telecommunications device as a subscriber of the telecommunications initiated data fulfillment service.

The telecommunications device may retrieve the pre-defined data address, typically the address for the data fulfillment center or an Internet service provider, from a home location register associated with a mobile telecommunication system. In addition, the data message is typically delivered to the data address through a signaling system message, such as an SS7 or X-25 message. In addition, the identification code associated with the telecommunications device may be extracted from a call detail record created by a telecommunications switch receiving the communication. The pre-defined data address may be retrieved from a proprietary database maintained by a provider of the telecommunications initiated data fulfillment service.

In addition, the data fulfillment center may respond to the data message by transmitting a control signal to operate a remote device. For example, the response action may open a car lock or garage door, activate or deactivate a security system, program a remote device, or perform a wide range of other remote control operations. In another alternative, the input sequence may include a displayed item code associated with a product or service offered for sale. In this case, the data fulfillment center may respond to the data message by: looking up an e-mail address associated with the telecommunications device, and transmitting an electronic message including promotional information concerning the product or service offered for sale to the address associated with the telecommunications device.

In this specification, certain actions are described as being performed by a telecommunications switch and others are described as being performed by a data fulfillment platform. However, those skilled in the art will appreciate that these devices could be combined into a single device or system of devices, and the invention defined by the method and steps described herein is not limited to performance by any particular devices. For example, some or all of the steps described as performed by the switch may be performed by the data fulfillment platform, and vice versa. In addition, a third device may be deployed to implement certain steps. These types of variations are within the scope of the present invention.

In addition, the originating telecommunications device is shown in certain figures and described as being a wireless or land-line telephone device. However, those skilled in the art will appreciate that the originating telecommunications device may be any type of device, known at present or developed in the future, capable of initiating telecommunications. In particular, wireless telephones, land-line telephones, desktop computers, portable computers, personal digital assistants, pagers, and so forth are within the scope of the term "telecommunications device" as used in this specification. Further, the methods and systems described herein are not limited to any particular type of telecommunication initiation, such as dialing or keypad input. Rather, the methods and systems described in this specification may work with any type of telecommunication initiation, known at present or developed in the future, such as voice recognition, auto dialing, e-mail, message relay, and the like.

In view of the foregoing, it will be appreciated that the present invention greatly improves the integration of the telecommunications system, the wireless data system, and the Internet to provide a wide range of new services that can be conveniently and cost effectively provided through these media. The specific techniques and structures employed by the invention as improvements over the drawbacks of the present telecommunications infrastructure and accomplish the advantages described above will become apparent from the following detailed description of the embodiments of the invention and the appended drawings and claims.

DETAILED DESCRIPTION OF THE EMBODIMENTS

Figure 1:
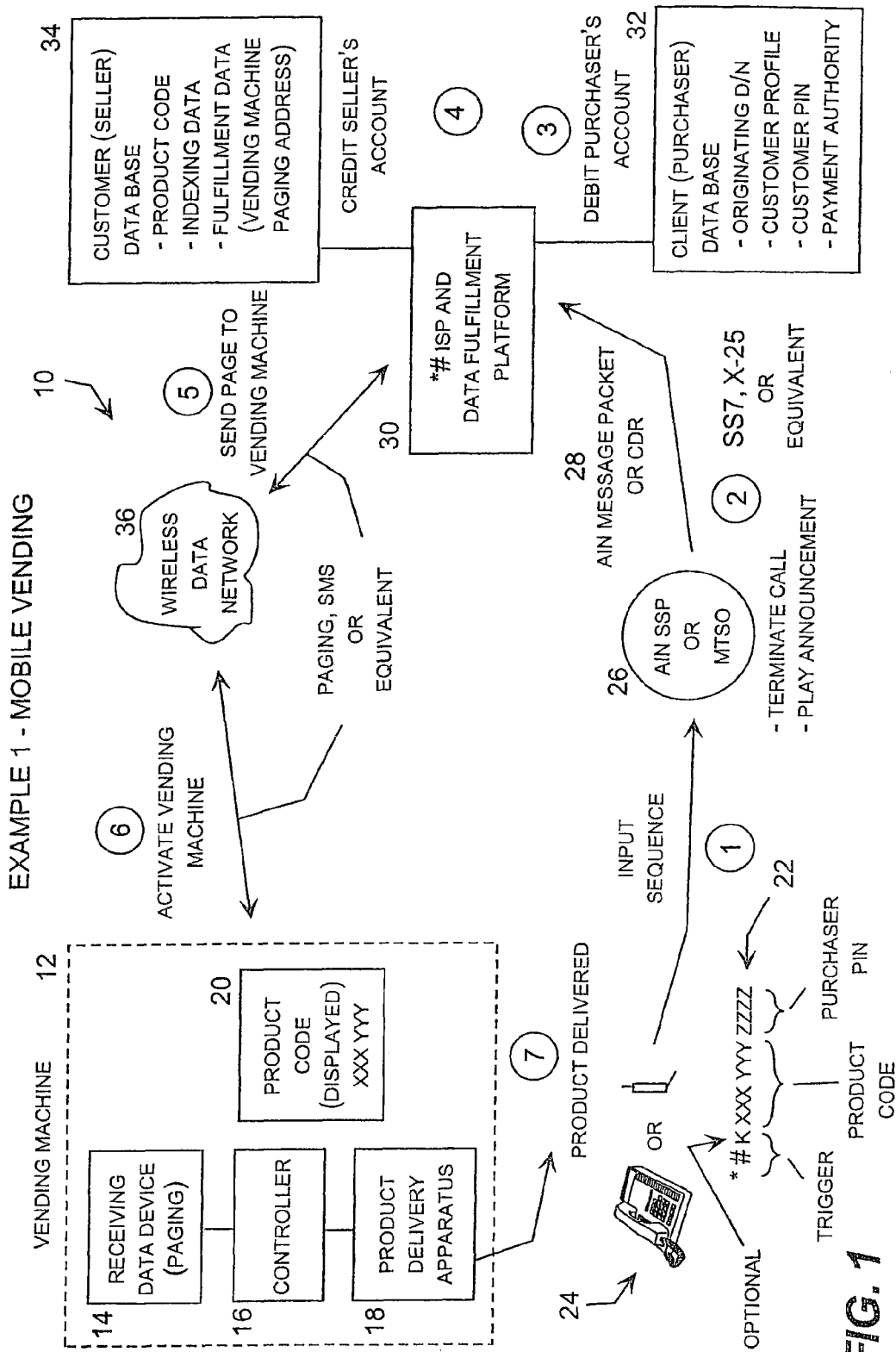
FIG. 1 is a functional diagram of a mobile vending service implemented by a telecommunications initiated data fulfillment system.

The present invention may be embodied in a telecommunications initiated data fulfillment system that typically involves a number of telecommunications switches and one or more data fulfillment platforms. The telecommunications switches are configured to recognize a multi-function code, such as "*#" (star, pound), as a trigger event. In response to a detected trigger event, the receiving telecommunications switch typically holds the call and looks up an instruction set associated with the trigger, and implements that instruction set. The multi-function code may include the "star, pound" initiation code followed by an instruction index indicating an instruction set to be implemented. For example, *#1 may indicate a mobile vending instruction set, *#2 may indicate a mobile data delivery instruction set, *#3 may indicate an Internet access instruction set, *#4 may indicate a remote control instruction set, and so forth.

The instruction set for different services may vary, but typically includes instructions or directions to the telecommunications switch to route the call to an announcement, assemble a data message of predefined structure, and transmit the data message to an address associated with a data fulfillment platform. For example, the announcement may state, "Your mobile vending request has been received and will be acted on immediately. Thank you." The data message typically includes the identifying information for the originating telecommunications device, such as the directory number assigned to that device, and the multi-function code service request, which is the input string entered into the telecommunications device to initiate the service. The data message may also include location data pertaining to the originating telecommunications device, such as information identifying the MTSO and cell tower that initially received the communication from the telecommunications device. The data message is typically delivered to the data fulfillment platform using the conventional signaling system, such as the SS7 signaling system used for most land-line systems, or the X-25 signaling system used for most mobile systems in the United States and Canada.

The data fulfillment platform typically looks up a customer profile associated with the identifying information for the originating telecommunications device, which may be programmed by the customer using an Internet interface or other suitable access method. The customer profile specifies the customer's desired delivery terms, such as an account to charge for vending services, an e-mail address for delivering data messages, addresses for devices to be remotely controlled, and so forth. The customer profile may also include service-limiting terms, such as spending limits, security procedures, geographical use limits, and the like. In addition, the data fulfillment platform may look up information for responding to the data request based on the input sequence. For example, in an Internet access service, the input sequence may correspond to a desired Internet address, and the data fulfillment may initiate an Internet session between the originating telecommunications device and a machine associated with the desired Internet address. In particular, the directory number assigned to a person's wireless telephone may be associated with that same person's Internet address, so that the input of an appropriate multi-function code followed by the directory number assigned to a person's wireless telephone may automatically cause an Internet session to be initiated between the originating telecommunications device and the machine associated with the desired Internet address.

Thus, in one embodiment, the telecommunications system recognizes the multi-function code as a trigger, and in response automatically terminates the call to an announcement and routes a message to a data fulfillment center. This message typically includes the multi-function code service request input by the customer along with identifying information for the initiating telecommunications device (e.g., originating directory number, MIN, EIN or another suitable identifier), and may include additional information, such as location information (e.g., information identifying the originating MTSO and cell tower) pertaining to the originating telecommunications device. The message is typically transmitted to the data fulfillment center using the telecommunications system's signaling system, such as the advanced intelligent network (AIN), the SS7 signaling system currently deployed for most land-based telecommunications systems, or the X-25 signaling system currently deployed for most mobile telecommunications systems.

The data fulfillment center responds to the message by implementing a service connoted by the multi-function code service request. For example, the data fulfillment center may respond by transmitting a message over a wireless data network or the Internet to implement a service, such as activation of a vending machine, remote control of a device, delivery of a message over the Internet, delivery of a message over a wireless data network, or initiation of an interactive Internet session with the originating device. A charge for this service, if appropriate, may be automatically charged to an account associated with the originating telecommunications device, which may be billed separately or incorporated on the user's conventional monthly telecommunications invoice.

Although a virtually limitless number of service options may be initiated and billed for, if desired, in this manner, several particularly strategic services are described in this specification to illustrate this technology. A first example is mobile vending, in which a series of product codes may be displayed on a vending machine. To make a purchase, the customer enters the multi-function code, such as "*#" (star, pound), into his or her wireless telecommunications device, optionally followed by a service index (e.g., "1" to indicate mobile vending), followed by the displayed product code (e.g., a six digit numeric code represented as "xxx yyy") followed by his or her personal identification number (PIN) (e.g., a four digit numeric code represented as "zzzz"). This thirteen digit data entry (e.g., *#1 xxx yyy zzzz) resembles a three digit multi function code (e.g., *#1) followed by a conventional ten digit directory number (xxx yyy zzzz). In response to this multi-function code, the data fulfillment center transmits a wireless data message to the vending machine to activate delivery of the indicated product, and charges an account associated with the originating telecommunications device for the purchase. Those skilled in the art will appreciate that the process described above may be used to implement a nationwide or worldwide cashless, secure and convenient telecommunications initiated mobile vending system.

A second example of this technology is mobile data acquisition. For example, an advertiser may display an advertising code rather than a vending code. A different service index may be used to distinguish mobile data acquisition from mobile vending (e.g., "*#2" indicates mobile data acquisition, whereas "*#1" indicates mobile vending). In addition, if the user is not to be charged for this service, the user's PIN may not be required as part of the multi-function code service request. Thus, the advertising code may be up to a ten digit code, which results in up to a thirteen digit multi-function code service request similar in format to that used for mobile vending. In response to the multi-function code service request, the data fulfillment center typically sends an e-mail message to an e-mail address stored in association with the customer's originating directory number. For example, a restaurant may display an advertising code, and the data fulfillment center may respond to receipt of a multi-function code service request containing the restaurant's advertising code by e-mailing the restaurant's menu to an e-mail address associated with the directory number assigned to the originating telecommunications device.

The system described above may be used to deliver virtually any type of data associated with a displayed advertising code, such as product information, driving directions, coupons, financial prospectus, inventory listing, safety guidelines, repair instructions, schematic diagram, event ticketing or access credentials, photograph, weather forecast, music file, and the like. The proprietor simply displays in any appropriate media a message to the effect of, "To obtain more information dial *#2 xxx yyy zzzz." Of course, the multi-function code service request may be altered to provide PIN security and transaction-based billing for the delivered data if desired. Those skilled in the art will appreciate that the process described above may be used to implement a nationwide or worldwide telecommunications initiated data delivery system to aid in billboard, print media, broadcast and other types of advertising and sale of information.

Additional applications of this technology, and specific implementation details, are described below with reference to the appended figures. Turning now to the drawings, in which like numerals refer to like elements throughout the several figures, FIG. 1 is a functional diagram of a mobile vending service implemented by a telecommunications initiated data fulfillment system 10. In this type of system, the products to be sold are typically located within a vending machine 12 that includes data receiving device 14, such as a paging unit, short messaging system (SMS), wireless data, or other suitable wireless data receiving device. Although a wireless data receiving device should be preferred for most applications, the data receiving device 14 may alternatively be a land-line device, such as a telephone device, Internet connection, e-mail receiving device, or any other suitable data receiving device. The only requirement for the data receiving device 14 is that is be operational for receiving control commands from a remote location for operating the vending machine 12. The vending machine may be operable to sell a wide variety of products, such as food, drinks, tokens for operating other machines, cameras, movie tickets, clothing, gasoline and so forth.

The vending machine 12 also includes a controller 16, a product delivery apparatus 18 and a product code display 20. The controller 16 is operationally interfaced with the wireless data device 14 and the product delivery apparatus 18, which allows the product delivery apparatus 18 to be operated in response to control commands from a remote location by the data receiving device 14. Typically, the product code display 20 includes a different displayed product code for each type of product that may be sold through the vending machine 12. In this particular example, the displayed product code is a six digit numeric code in the form "xxx yyy." It will be appreciated, however, that the mobile vending system 10 could utilize any other type of code that can be entered into a telecommunications device.

To make a purchase from the vending machine 12, a customer of the telecommunications initiated data fulfillment system 10 simply enters an easily ascertained multi-function code service request into an originating telecommunications device, such as his or her mobile telephone. For example, the multi-function code service request may include a predefined multi-function code, such as *# (star, pound), which may optionally include an index connoting mobile vending (e.g., index=1 for mobile vending), followed by the displayed product code for the desired product, followed by the customer's personal identification number (PIN), into his or her mobile telephone. Thus, the multi-function code service request in this instance may be "*#1 xxx yyy zzz" where "#" is the predefined multi-function code, "1" is an index indicating mobile vending, "xxx yyy" is the displayed product code for the desired product, and "zzzz" is the customer's PIN number.

In response to receiving this multi-function code service request, the mobile vending system 10 validates the customer's PIN, may apply conditions based on a customer profile and/or location data associated with the originating telecommunications device, and makes a determination whether the requesting vending purchase is authorized. If the vending purchase is authorized, the mobile vending system 10 remotely activates the vending machine 12 to deliver the purchased product, and charges an account associated with the originating telecommunications device for the cost of the purchase. This cost may be separately billed, or it may be incorporated on the customer's monthly telecommunications invoice.

More particularly, FIG. 1 illustrates the steps implemented to complete the mobile vending transaction described above. In step one, the customer enters the appropriate input string 22, namely the multi-function code service request described above, into his or her telecommunications device 24. The input string 22 is received at a trigger-enabled telecommunications switch 26, such as an advanced intelligent network (AIN) enabled system switching point (SSP) or mobile telephone switching office (MTSO). Although this will typically be the first telecommunications switch to receive the input string 22, it is possible that a prior switching device, such as a non-trigger-enabled switch, will initially receive and route the call to the trigger-enabled telecommunications switch 26. This switch is configured to detect and recognize the "*#" (star, pound) multi-function code as a trigger event. In response to detecting the star, pound trigger event, the switch 26 holds the call and looks up an instruction set to implement. Typically, the switch 26 may be configured to look up and implement ten different multi-function code instruction sets, as indicated by an index included in the first digit following the multi-function code. For example *#1 may indicate a mobile vending instruction set. Those skilled in the art will appreciate that AIN enabled SSP and MTSO devices are conventionally equipped to recognize trigger events, to look up instruction sets, and to implement those instruction sets. In this manner, the mobile vending system 10 anticipates the use of presently existing telecommunications system features to implement this new service.

The mobile vending instruction set typically instructs the switch 26 to terminate the call to an appropriate announcement. For example, the announcement may state, "Your mobile vending request has been received and will be acted on immediately. Thank you." At the end of the announcement, the call is discontinued, which frees the customer's telecommunications device to engage in a subsequent communication. The mobile vending instruction set also instructs the switch 26 to look up a data address, assemble a data message 28, and send the data message to the data address. For example, the data address may identify a data fulfillment platform 30 operated by the proprietor of the mobile vending system 10. The data message typically includes the identifying information for the originating telecommunications device 24, such as the directory number assigned to that device, and the multi-function code service request, which is the input sequence 22 entered into the telecommunications device to initiate the service.

In a mobile vending application, the data message should also include location data pertaining to the originating telecommunications device, such information identifying the MTSO and cell tower that initially received the communication from the telecommunications device. This allows the data fulfillment platform 30 to customize its response by sending a mobile vending activation message to the appropriate vending machine 12, which is located in the coverage area of the identified cell tower. This feature advantageously allows reuse of the vending codes in multiple locations served by different cell towers.

In step 2, the switch 26 delivers the data message 28 to the data fulfillment platform 30. The data message is typically delivered to the data fulfillment platform using the conventional signaling system, such as the SS7 signaling system used for most land-line systems, or the X-25 signaling system used for most mobile systems in the United States and Canada. However, another type of data system could be used, such as the Internet, an intranet, or another suitable communications medium.

For example, the information needed to create the data message 28 may be obtained from a conventional call detail record (CDR) created by the switch 26. It will be appreciated that virtually all telecommunications switches create CDRs as part of their normal operations. These CDRs include the input sequence and the originating directory number for all telecommunications calls originated by the switch, and for MTSO systems include location information regarding the originating location of the call, and therefore contain the information necessary to assemble the data message 28. Accordingly, a proprietary device may read the information necessary to assemble the data message 28 from a completed CDR, and the proprietary device may, in turn, assemble the data message 28. This may be advantageous to shift the processing burden associated with assembling the data message 28 from the switch 26 to the proprietary device. A completed CDR record may be read directly from the switch 26, or from another device, such as a mediation device used to integrate the switch 26 with a billing system computer in some applications. In addition, to reduce latency in creation of the data message 28, it may also be advantageous to read the in-process CDRs as they are created by the switch 26, so that the data message 28 may be assembled contemporaneously with the handling of the incoming call by the switch. Those skilled in the art will appreciate that a "sniffer" circuit or similar type of data tap may be installed on the switch 26 to read and pass on in-process CDR information to the proprietary device.

The data fulfillment platform 30 receives the data message 28, and readily identifies the originating telecommunications device 24 from the directory number assigned to that device, which is included as part of the data message. The data fulfillment platform 30 also identifies the product code and the customer's PIN from the input sequence, which is also part of the data message 28. The data fulfillment platform 30 also identifies the location of the originating telecommunications device 24, which corresponds to the location of the vending machine 12, from the location data included in the data message 28. From the information, the data fulfillment platform 30 processes the multi-function code service request to complete the transaction.

More specifically, the data fulfillment platform 30 maintains a client data base 32 containing customer profile data indexed to the directory number assigned to each customer's telecommunications device. Of course, another data item may be used as the indexing parameter so long as the information contained in the data message 28 is sufficient to identify the correct customer profile record in the client data base 32. This customer profile record typically includes the directory number assigned to the corresponding customer's telecommunications device (or other indexing parameter), the customer's PIN, payment authority (e.g., credit account, debit account, wire transfer, or other payment authority), and may include other customer profile data to implement security or other types of purchasing limits. For example, the customer profile data may include spending limits, geographical use limits, and other suitable parameters for the data fulfillment platform 30 to use in determining whether to validate and execute a received multi-function code service request. The customer may preferably access his or her customer profile data to change the parameters, including the customers PIN and other security parameters, on an as-needed basis. Additional security measures, such as encryption keys and other types of electronic identification (e.g., storage and receipt of "mother's maiden name" and other techniques familiar to those skilled in the art), may be implemented at the data fulfillment platform 30 to prevent unauthorized access and alteration of customer profile data.

In step 3, the data fulfillment platform 30 validates the received multi-function code service request, typically verifying that the correct PIN is included in the input sequence 22. The data fulfillment platform 30 also determines whether to execute the purchase based on the customer profile data, and by checking whether payment authority is presently valid for the amount of the requested purchase. If the request is valid and authorized, the data fulfillment platform 30 charges the cost of the purchase to the customer's account. In step 4, the data fulfillment platform 30 credits the vendor's account for the amount of the purchase, which is typically entered into a customer database 34 maintained or contacted by the data fulfillment platform 30. That is, the data fulfillment platform 30 completes the financial portion of the transaction by charging the customer's account, and crediting the vendor's account, for the amount of the purchase.

In step 5, the data fulfillment platform 30 implements the response action, namely, remote activation of the vending machine 12 to deliver the purchased product to the customer. This is typically implemented by sending a wireless data message from the data fulfillment platform 30 to the vending machine 12 over a wireless data network 36. Alternatively, a paging system, short messaging system associated with a mobile telephone system, or other type of wireless data message may be used. In addition, if the vending machine 12 has some type of land-line connection, a land-line telephone, Internet or similar type of message may be used to activate the vending machine. The only requirement is that the data fulfillment platform 30 be capable of remotely activating the vending machine 12, either directly or indirectly, after it has verified the multi-function code service request and validated the payment authorization, and in connection with completing the financial portion of the transaction.

Although the mobile vending system 10 is described above in connection with a remotely operated vending machine 12, it should be appreciated that an analogous system could be used to implement a cashless vending system without the use of physical vending machines. That is, the vending machine could be effectively replaced by a "cashless register" operated by a vendor, in which the activation message is replaced by a payment confirmation message. For example, a purchaser may enter a product code into his or her telecommunications device in a store environment, and the data fulfillment platform 30 may send a payment confirmation message back to the vendor's telecommunications device, after the data fulfillment platform 30 has verified the multi-function code service request and validated the payment authorization, and in connection with completing the financial portion of the transaction. In this manner, the vendor's telecommunications device acts as a "cashless register" in a cashless vending system.

In another alternative, the originating telecommunications device 24 may serve as the receiving device for the response action to the multi-function code service request. Similarly, another machine, such as a home computer identified in the customer' profile, could serve as the receiving device. This alternative is particularly useful for implementing a delivery system for electronic information, such as news, music, multimedia, literature, and so forth. In addition, if the data delivery is free, the PIN code and financial steps are not necessary, which simplifies the data fulfillment process. In this type of application, the customer may simply enter a multi-function code service request including an advertising code, and automatically receive a data transmission corresponding to the advertising code. The system described above may be used to deliver virtually any type of data associated with a displayed advertising code, such as product information, driving directions, coupons, financial prospectus, inventory listing, safety guidelines, repair instructions, schematic diagram, event tickets and access credentials, photograph, weather forecast, music file, and the like. In addition, the customer may specify the receiving device for the information in his or her customer profile maintained in the client database 32. For example, a first device may be identified for receiving music, another device may be identified for receiving literature, and a third device may be identified for receiving weather or driving instructions. Because the customer may alter his or her customer profile "on the fly" using his or her telecommunications device to access the data fulfillment platform 30, the system described has a great flexibility and may be used for many types of data fulfillment services.

Figure 2:
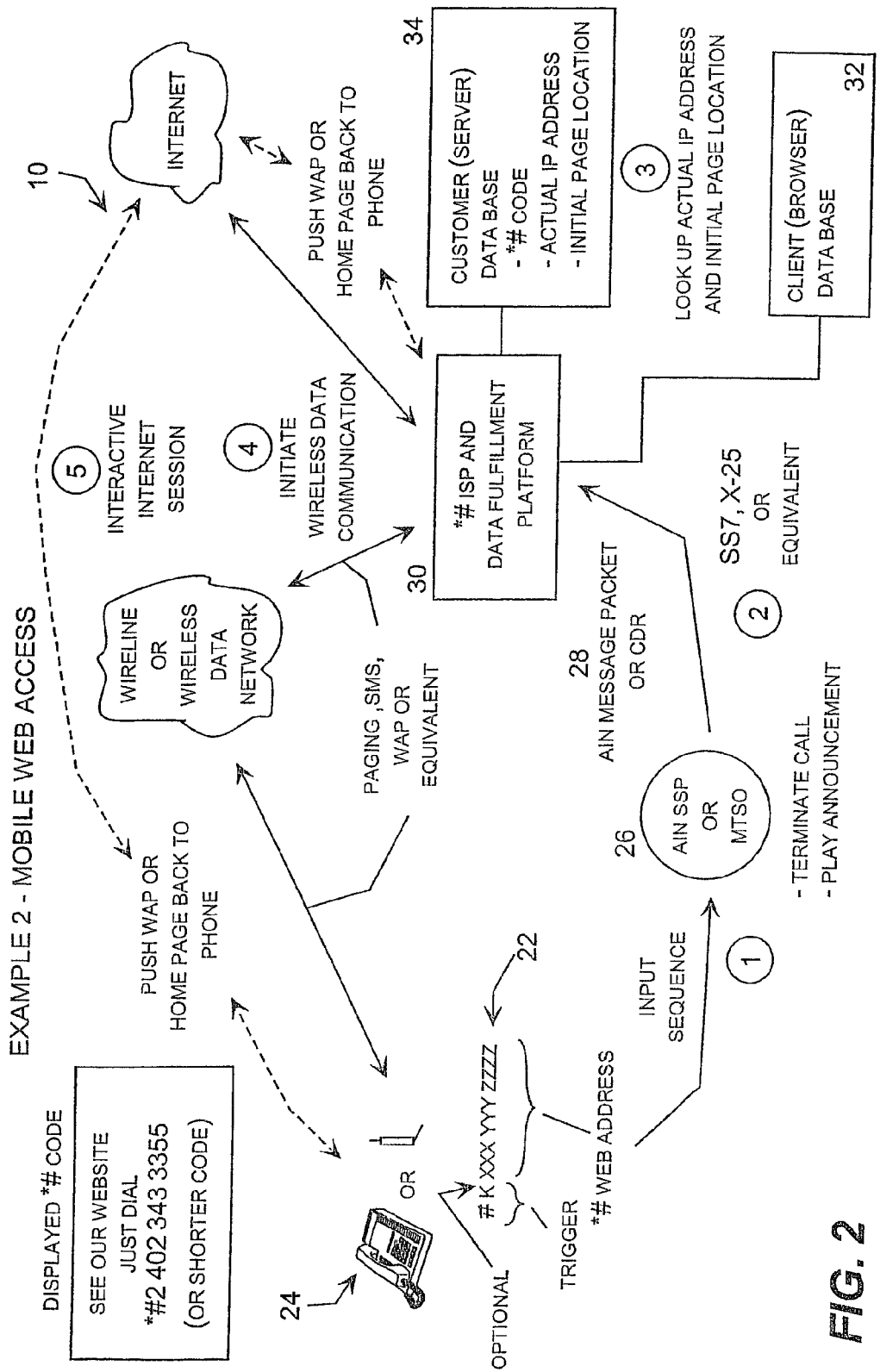
FIG. 2 is a functional diagram of a mobile web access service implemented by a telecommunications initiated data fulfillment system.

FIG. 2 is a functional diagram of a mobile web access service implemented by the telecommunications initiated data fulfillment system 10. This system is similar to the system described above, except that a displayed advertising code is associated with an Internet, mobile browser or WAP address, and as the response action, the data fulfillment platform 30 initiates an interactive Internet session between the originating telecommunications device 24 and the Internet, mobile browser or WAP site identified by the advertising code. In other words, the customer simply enters the appropriate multi-function code service request into his or her wireless telecommunications device, the data fulfillment platform 30 responds by initiating an interactive Internet session with the originating telecommunications device 24 and pushing a WAP, mobile browser or Internet page back to the originating telecommunications device 24 to initiate the session. It should be noted that the multi-function code service request may be entered with the originating telecommunications device 24 in an analog "normal telephone" mode. That communication is terminated to an announcement and then discontinued to free the originating telecommunications device 24 to receive the incoming Internet, mobile browser or WAP page, which will typically be received in a digital or "Internet" mode. Thus, this application may be implemented on most WAP, mobile browser or Internet enabled wireless telecommunications devices without having to alter the device to include a modem or to accommodate on-line mode switching.

More particularly, in step one, the customer enters the appropriate input string 22, namely the multi-function code service request described previously, into his or her telecommunications device 24. The input string 22 is received at a trigger-enabled telecommunications switch 26, such as an advanced intelligent network (AIN) enabled system switching point (SSP) or mobile telephone switching office (MTSO). This switch is configured to detect and recognize the "*#" (star, pound) multi-function code as a trigger event. In response to detecting the star, pound trigger event, the switch 26 holds the call and looks up an instruction set to implement. For example *#2 may indicate a mobile web access instruction set.

The mobile web access instruction set typically instructs the switch 26 to terminate the call to an appropriate announcement. For example, the announcement may state, "Your mobile web access has been received and will be acted on immediately. Please place your device in an Internet mode, if appropriate, and keep it idle for a few moments. Thank you." At the end of the announcement, the call is discontinued, which frees the customer's telecommunications device to receive an incoming or "pushed" WAP, mobile browser or Internet page, and engage in an Interactive Internet session. The mobile web access instruction set also instructs the switch 26 to look up a data address, assemble a data message 28, and send the data message to the data address. For example, the data address may identify a data fulfillment platform 30 operated by the proprietor of the telecommunications initiated data fulfillment system 10. The data message typically includes the identifying information for the originating telecommunications device 24, such as the directory number assigned to that device, and the multi-function code service request, which is the input sequence 22 entered into the telecommunications device to initiate the service. In a mobile web access application, the data message may not include the customer's PIN or location data. However, these parameters may be included if financial and/or location-based processing is implemented. This might be the case, for example, if the accessed Internet site is a commercial site, such as an on-line shopping venue.

In step 2, the switch 26 delivers the data message 28 to the data fulfillment platform 30. The data message is typically delivered to the data fulfillment platform using the conventional signaling system, such as the SS7 signaling system used for most land-line systems, or the X-25 signaling system used for most mobile systems in the United States and Canada. However, another type of data system could be used, such as the Internet, an intranet, or another suitable communications medium. For example, the information needed to create the data message 28 may be obtained from a conventional call detail record (CDR) created by the switch 26, as described previously.

The data fulfillment platform 30 receives the data message 28, and readily identifies the originating telecommunications device 24 from the directory number assigned to that device, which is included as part of the data message. The data fulfillment platform 30 also identifies the advertised code, and optionally the customer's PIN from the input sequence, which is also part of the data message 28. From the information, the data fulfillment platform 30 processes the multi-function code service request to complete the transaction.

In step 3, the data fulfillment platform 30 obtains the appropriate Internet, mobile browser or WAP address from a customer data base 40, which indexes the displayed advertising code to an Internet address and an initial page location. In step 4, the data fulfillment platform 30, which in this application is operating as an Internet Service Provider, links to the Internet, mobile browser or WAP address. In step 5, the data fulfillment platform 30 pushes the appropriate page back to the originating telecommunications device 24 to initiate an interactive Internet session.

In a variation of this service, a directory number assigned to a person's wireless telecommunications device may serve as a "star, pound" WAP or mobile browser access code. That is, the input directory number may implement a voice-channel telephone call to the person's wireless telecommunications device, whereas the input of "star, pound" may implement a digital WAP or mobile browser communication to the same device. In this manner, any type of analog or digital information may be conveyed to a telecommunications device using the same directory number. Is should be appreciated that this dual-use directory number concept will greatly facilitate the integration of wireless telecommunications and wireless data functionality, and has the potential to greatly expand mobile computing capabilities.

Figure 3:
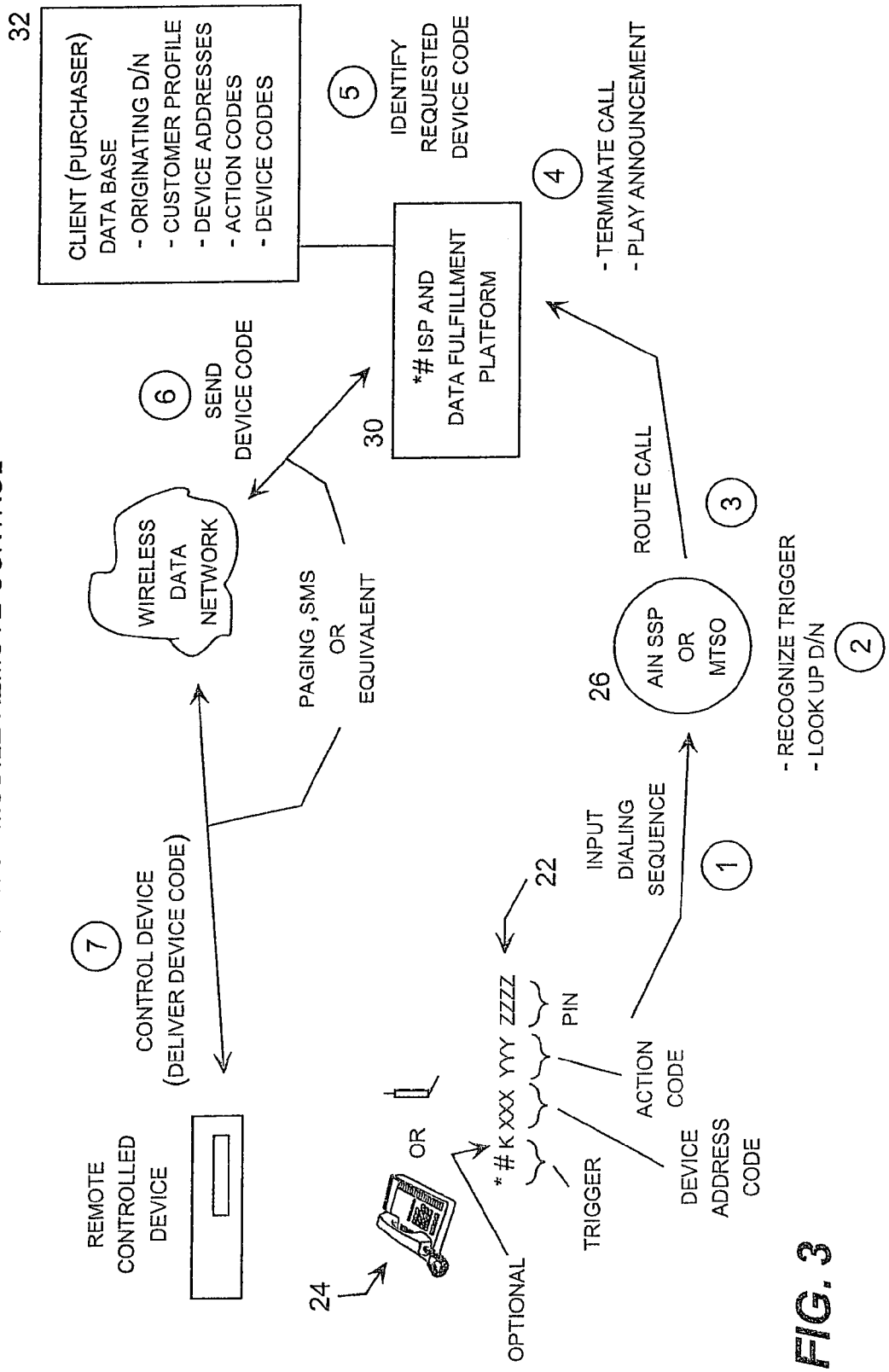
FIG. 3 is a functional diagram of a mobile remote control service implemented by a telecommunications initiated data fulfillment system.

FIG. 3 is a functional diagram of a mobile remote control service implemented by a telecommunications initiated data fulfillment system. This system is virtually the same as the mobile vending system described with reference to FIG. 1, except that the customer's equipment may be remotely controlled with the system. For example, this system may be used to open car or garage doors, activate or deactivate security systems, program devices, and so forth. For example, this type of system could be used to remotely disable a stolen automobile, activate an alarm in the automobile, or to deter theft and aid in the apprehension of the thief. Alternatively, this type of system could be used to remotely activate a GPS tracking system and/or alarm system to help track and locate missing persons or pets. On a different note, the system could be used to remotely disable telephones and televisions in a teenager's room at a specified hour, disable vehicles or other appliances while a homeowner is away, and so forth. Or it could be used to remotely activate pet or livestock feeding equipment, or turn on lawn sprinklers, or initiate data downloads, on demand or according to a set schedule. Indeed, the variety of useful applications for remotely controlling devices using this technology is virtually limitless.

Figure 4:
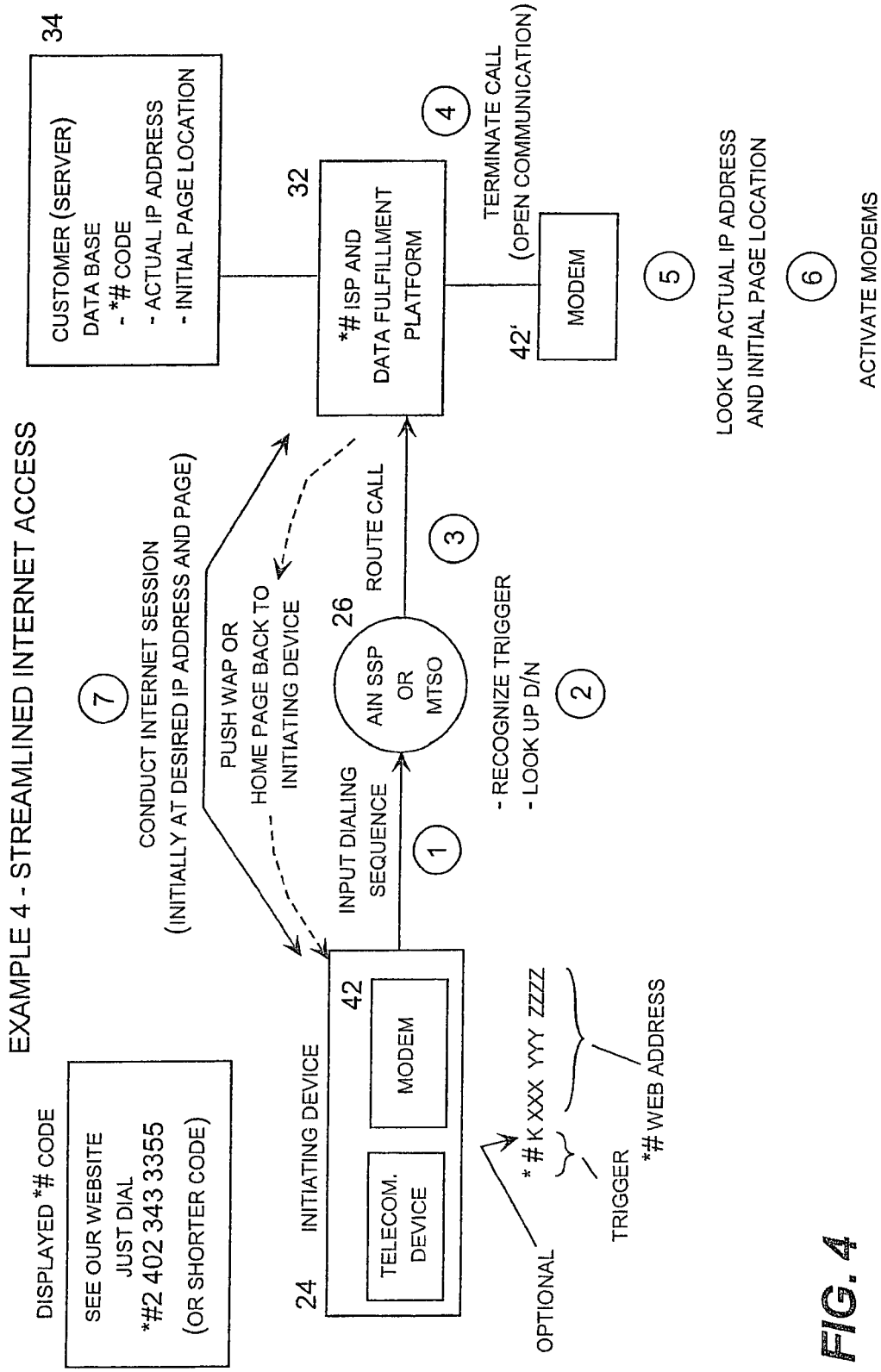
FIG. 4 is a functional diagram of a streamlined Internet access service implemented by a telecommunications initiated data fulfillment system.

FIG. 4 is a functional diagram of a streamlined Internet access service implemented by a telecommunications initiated data fulfillment system 10. This system is similar to the mobile web access system described with reference to FIG. 2, except that the originating telecommunications device 24 includes a modem 42, which allows the device to receive computer data over an analog telephone connection. In addition, the switch 26 does not terminate the incoming call to an announcement, but instead looks up a directory number associated with the input "star, pound" string, and routes the telecommunications call using that directory number in the usual way. The switch 26 also places the input sequence (e.g., *#4 xxx yyy zzzz) in an available field in the routing message header, where it can be retrieved by the data fulfillment platform 30 when it receives the telecommunications call.

The switch 26 then routes the retrieved directory number, which is assigned to the data fulfillment platform 30. In this alternative, the data fulfillment platform 30 operates as a conventional ISP, except that it initiates the Internet session by linking the originating telecommunications device to an Internet page indicated by the input sequence. That is, the data fulfillment platform 30 receives the telecommunications call, maintains an open analog communication with the originating telecommunications device 24, and initiates an Internet session between the originating telecommunications device and the Internet site identified by the input sequence. This is the same method in which analog telephones are used to access the Internet, except that this streamlines the link to the Internet site identified by the input sequence.

For the user of the originating telecommunications device 24, this streamlined Internet access service makes it easier to initiate an Internet session and link to a desired address. That is, the user simply enters an input sequence comprising the appropriate multi-function code service request, and the Internet session automatically initiates with a link established to the Internet site identified by the input sequence. This system may also be modified to provide streamlined access to location-specific data. For example, a predefined "star, pound" code may be used to obtain a road map, weather report, traffic report, or list of restaurants based on the current location of the originating telecommunications device 24.

Figure 5:
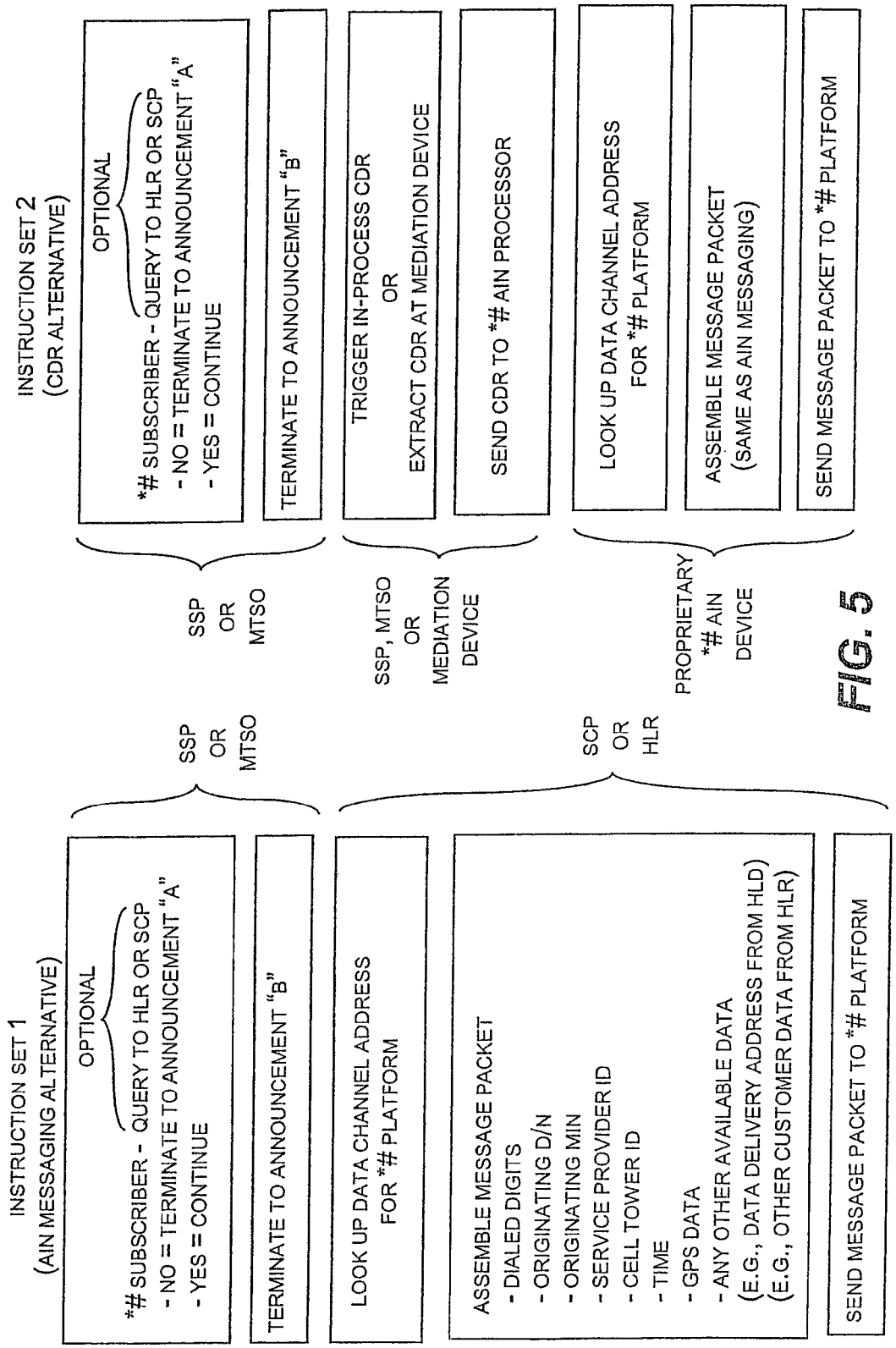
FIG. 5 is an instruction set diagram illustrating advanced intelligent network (AIN) and call detail record (CDR) alternative implementation methodologies for implementing a telecommunications initiated data fulfillment system.

FIG. 5 is an instruction set diagram illustrating an advanced intelligent network (AIN) and call detail record (CDR) alternative implementation methodologies for implementing a telecommunications initiated data fulfillment system. This diagram illustrates the steps that are implemented by specific pieces of equipment to implement the telecommunications initiated data fulfillment system 10 using currently deployed telecommunications infrastructure.

In instruction set 1, the AIN capability of SSP and MTSO telecommunications devices is used to implement the telecommunications initiated data fulfillment system. Specifically, an SSP or MTSO receives the incoming communication from the originating telecommunications device 24, and recognizes the multi-function code trigger event. The SSP or MTSO may then make an optional query to a service control point (SCP) or home location register (HLR) to determine whether the originating telecommunications device 24 is authorized to utilize the "star, pound" system, typically with reference to a subscriber database indexed by the originating directory number (i.e., the directory number assigned to the originating telephone device 24). If the originating telecommunications device 24 is not authorized to utilize the "star, pound" system, the SSP or MTSO terminates the call to an announcement, such as, "You will now be routed to a site where you can register for the star, pound service," and then routes the call to an appropriate registration platform.

If the originating telecommunications device 24 is authorized to utilize the "star, pound" system, the SSP or MTSO terminates the call to an announcement, such as, "Your data request has been received and will be acted on immediately. Thank you." The SCP or HLR then looks up a data address for the data fulfillment platform, assembles the appropriate data message, and transmits the data message to the data fulfillment platform over the SS7 or X-25 signaling system.

Instruction set 2 is similar to instruction set 1, except that a proprietary device reads information from CDRs or in-process CDRs to create the data message. That is, the processing performed by the SCP or HLR in instruction set is shifted to a proprietary device. Specifically, an SSP or MTSO receives the incoming communication from the originating telecommunications device 24, and recognizes the multi-function code trigger event. The SSP or MTSO may then make an optional query to a service control point (SCP) or home location register (HLR) to determine whether the originating telecommunications device 24 is authorized to utilize the "star, pound" system, typically with reference to a subscriber database indexed by the originating directory number (i.e., the directory number assigned to the originating telecommunications device 24). If the originating telecommunications device 24 is not authorized to utilize the "star, pound" system, the SSP or MTSO terminates the call to an announcement, such as, "You will now be routed to a site where you can register for the star, pound service," and then routes the call to an appropriate registration platform.

If the originating telecommunications device 24 is authorized to utilize the "star, pound" system, the SSP or MTSO terminates the call to an announcement, such as, "Your data request has been received and will be acted on immediately. Thank you." The SSP or MTSO then discontinues the communication in the usual way, which triggers the creation of a CDR record. The proprietary device, referred to in FIG. 5 as the "*# AIN processor" extracts information from the CDR or an in-process CDR at the switch or at a mediation device. The proprietary device then looks up a data address for the data fulfillment platform, assembles the appropriate data message, and transmits the data message to the data fulfillment platform over the SS7 or X-25 signaling system.

Figure 6:
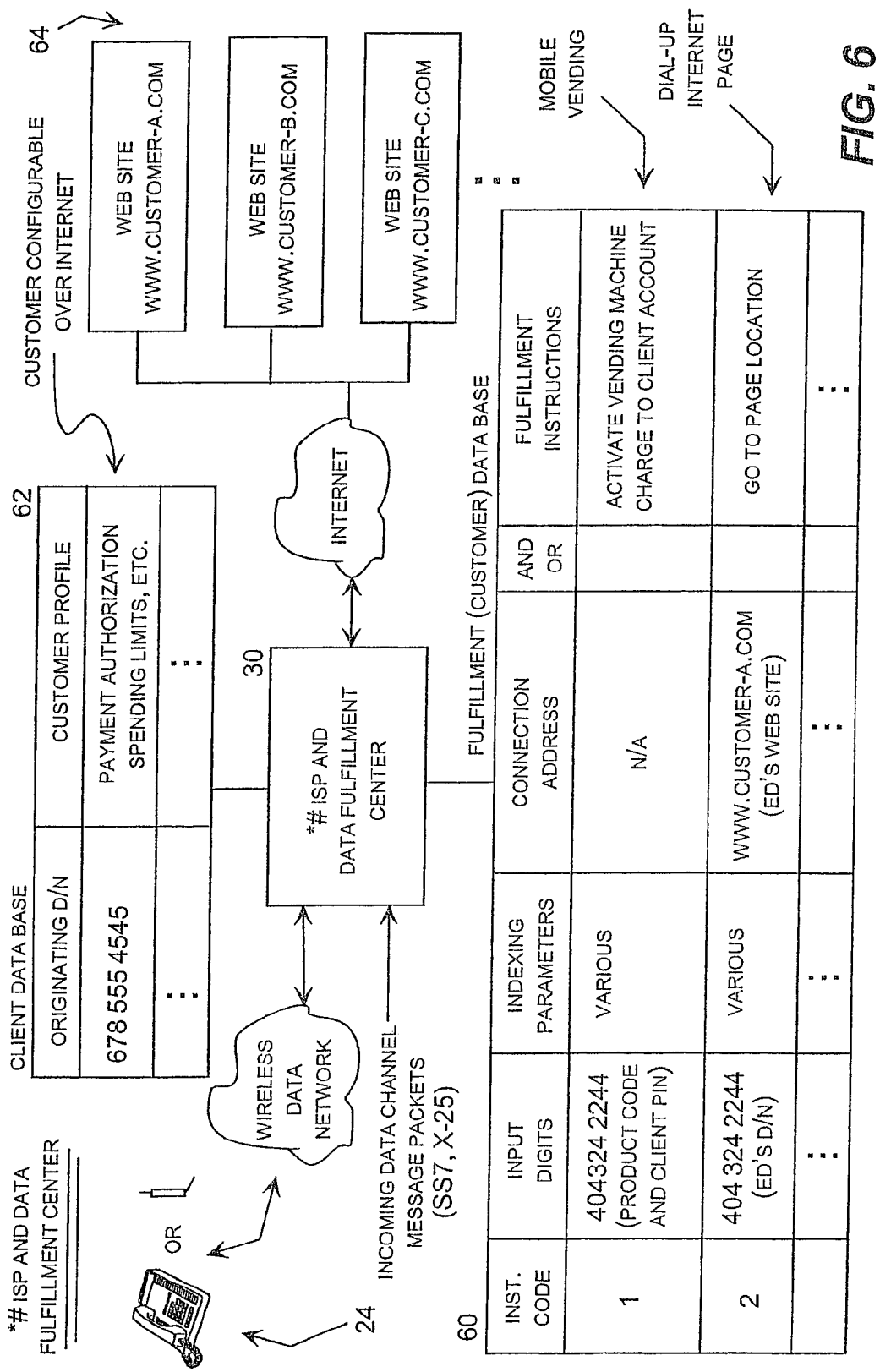
FIG. 6 is a functional diagram of a telecommunications initiated data fulfillment system illustrating features of a data fulfillment database.

FIG. 6 is a functional diagram of a telecommunications initiated data fulfillment system illustrating features of a data fulfillment database. In particular, the telecommunications initiated data fulfillment system shown in FIG. 6 illustrates a *# ISP and data fulfillment center 30 that includes a fulfillment database 60, a client database 62, and Internet interconnection facilities with a plurality of customer web sites 64. In this embodiment, the ISP and data fulfillment center 30 includes all of the intelligence required to implement the telecommunications initiated data fulfillment system, except *# trigger and messaging capability implemented, which is implemented at the SSP and MTSO devices that initially receive the multi-function code service requests. In addition, this SSP or MTSO based functionality may be unnecessary if another type of messaging system is used to deliver the multi-function code service requests from the originating telecommunications device 24 to the ISP and data fulfillment center 30, such as a wireless data network, e-mail, intranet, or any other suitable type of messaging system. The only requirement for implementing the telecommunications initiated data fulfillment system is that the message that reaches the data fulfillment center 30 include two pieces of information, the input sequence (i.e., multi-function code service request initiated by the originating telecommunications device 24) and identification information for the originating telecommunications device 24, such as the directory number assigned to the device.

Figure 7:
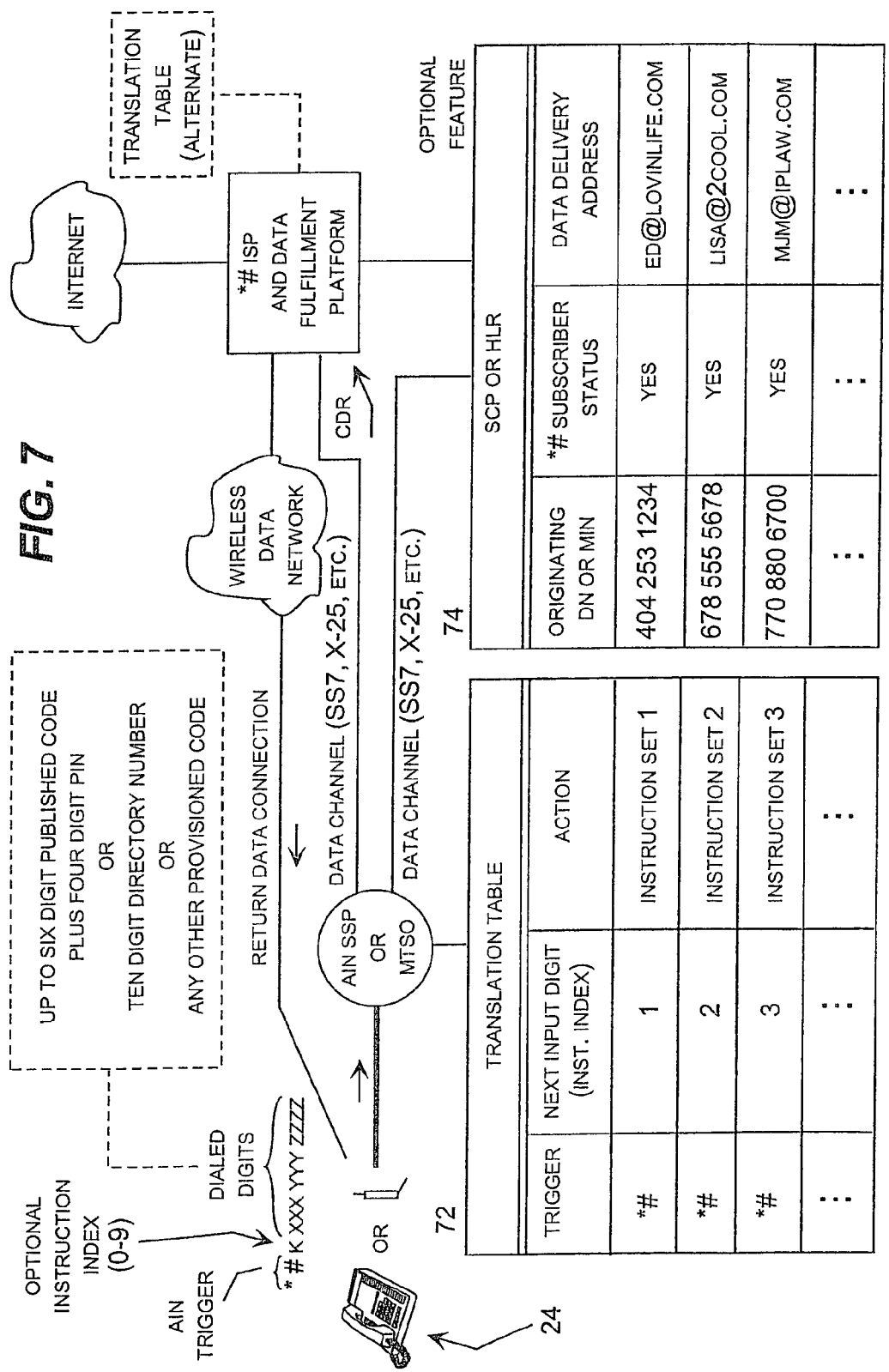
FIG. 7 is a functional diagram of a telecommunications initiated data fulfillment system illustrating features of implemented by an SCP or HLS.

FIG. 7 is a functional diagram of a telecommunications initiated data fulfillment system illustrating features implemented by an SCP or HLS. In this alternative, a large portion of the intelligence necessary to implement the telecommunications initiated data fulfillment system illustrating features of a data fulfillment database is implemented by the SSP and MTO devices through a switch-based translation table 72 and SCP (e.g., for SSP land-line systems) or HLR (e.g., for MTSO wireless systems). Those skilled in the art will recognize that the location of the intelligence is a design choice for the telecommunications initiated data fulfillment system, and will in most applications be driven by the type of entity that is implementing the system. In particular, regional telephone operating companies will most likely prefer the deployment shown in FIG. 7, whereas independent service providers will most likely prefer the deployment shown in FIG. 6.

In another application, the system described herein may be used to implement an abbreviated dialing system. For example, using a double function dialing prefix with a single or multi-digit identifier code that enables individual coding which can be used in both wireless, data, and PSTN networks to create a super ID that is tagged to an individual and superimposes over all device IDs the individual may possess, but is short enough to memorize for the general population (less than 10 digits beyond dialed prefix). This is unique in that it can represent both messaging and real-time communications contacts so that voice, data, video, text, and other forms of communications can reach an individual represented by this ID, not just wireless and PSTN calls or voice messages. Additionally, this number can be entered into a myriad of devices such as a wireless phone, PDA, PSTN phone, 2-way pager, web or IP-enabled device, or video-phone.

In another application, the system described herein may be used to implement a personal directory number system in which a single multi-function code directory number may link to multiple devices or device addresses used by the customer assigned that particular personal directory number. For example, entry of the designated multi-function code plus the customer's personal directory number (i.e., Individual ID) from an originating telecommunication device triggers the launch of the customer's personal contact web page (i.e., individual homepage) and automatic link or push of that page back to the originating telecommunication device. This personal contact web page, which is customizable by the customer, includes the data addresses for multiple communications devices, prioritized contact addresses, time-of-day based contact instructions, and so forth, for communicating with the customer. In addition, the identity of the originating telecommunication device may be used as a prioritizing or indexing parameter by the customer's personal contact web page. For example, the page may display the specific addresses, trigger a conference call, trigger an e-mail instant messaging session, or accept a voice or data message mail, a document, a picture, a music file, or any other suitable type of electronic information.

In particular, a user may enter someone else's Individual ID via manual, directory, or voice, into their cell phone and have that person's individual homepage be delivered via but, not limited to email, web, XML, or WAP. The individual's homepage can contain any information the individual wanted to present, but will also contain a "communications cockpit" which will enable the user to contact the individual through both voice and data means and through any device the individual has tagged under his/her universal ID communications umbrella which may include printers, vehicle communication, or home communication devices. These device IDs can be hidden from the user thereby eliminating need to list multiple contact numbers or addresses and protects anonymity.

The individual will also have the capability of determining rules for prioritizing, filtering, screening, and routing real-time communications and messaging via, but not limited to voice, email, fax, instant messaging, data, WAP, XML, HTML, and file transfer. This is unique in that universal messaging and single number services exist, but are not combined to provide a complete communications and messaging solution for individuals.

The system described herein combines the capabilities of both one number services and integrated messaging, and covers both voice and data communications, enables rules to be built governing when, where, how, and who can communicate with the individual using a myriad of different communications and messaging capabilities while being able to prioritize and select the best method available with the technology to reach to individual from any device that is connected to a wireless, wired voice, data, or IP network.

For example, an individual is sitting at a ball game at six o'clock in the afternoon on a Wednesday. A user decides to contact an individual for the first time by entering the Universal ID for the individual. The data fulfillment platform enables a WAP screen pop of the customer's homepage on the user's originating telecommunications device, in this example a WAP enabled wireless device. This WAP screen offers the user the ability to communicate with the individual in a myriad of ways through wireless interaction with the customer's homepage, such as: tag delivery as urgent, normal, or later delivery; real-time via voice, video, or instant messaging; messaging via voice, email, fax, video, or text. In addition, the customer will have the capability of setting rules within his or her homepage to implement the following: time based filtering and screening; priority filtering and screening; automatic number identification (ANI) based filtering and prioritizing; recognition of universal ID of individual contacting filtering and screening; real-time filtering and screening; dynamic routing of contact; translation text to speech, speech to text, and video to voice; prioritization of reception device based upon all above. For example, one possible prioritization scheme might be: after 6 PM all contacts are messaging to 2-way pager, but if "wife" (Universal ID *#1234567891) or recognized universal IDs marked "urgent" contacts, send to cell phone, if that does not answer send to home phone, if no answer, send to 2-way pager. Of course, a virtually unlimited number of different customer definable prioritization and screening schemes may be implemented using the systems and methods described herein.

In another application, the system described herein may be used to implement a geographic positioning and mapping system using wireless networks, wireless cell towers, and other GPS-like mapping systems to determine location of objects. In particular, the emergency "911" laws are forcing carriers to map the location of users for emergency services using GPS and speed/distance from cell tower location based mapping systems, but this only locates users and does not map objects. By labeling objects with a specific code and using a multi-function code prefix, objects can be coded and the specific object that the user desires can be mapped. By labeling a fixed location object, a user can then identify their location to that object for further action. By mapping an object to a specific location or grid, the object identifier grid system can be much smaller that traditional grid systems such as area or zip code. By localizing object mapping and using the wireless infrastructure, the grid system can shorten the object identifier to less than 5 digits, but remain universal throughout the planet.

In another application, the system described herein may be used to implement user-determined soft switching using a wireless network, separating routing over network based on the presence or absence of a multi-function code dialing prefix. For example, by entering a multi-function code dialed prefix or key word via manual, directory, or voice, the user can select the purpose of usage over a wireless provider's network; internet, communication via voice, communication via text, or voice, video, or text messaging using the same data or voice network. This is unique in that today, the methodology is to complete a call or to specifically enable a data connection via the wireless device, but not to be able to allow the user to determine the format and method of information delivery (messaging) and real-time communication. By enabling user requested functionality, legacy switches can route special function "information actions" through a data network to a platform to fulfill the user requested function while maintaining the existing wireless network for voice traffic.

The enabling technology provides for the electronic capture of information via common mobile devices allowing mobile users to conveniently retrieve information on-demand.

The data wireless market is in its infancy and promises to transform the way communications work. Most efforts in the market thus far have been directed towards creating mobile access to portal information, or developing basic purchasing functions via mobile devices. Many companies are working on broadcasting information to devices, and some are developing "push" technologies using GPS for location specific information delivery. Experts question the widespread acceptance of the "push" technologies, due to the user's inability to filter content and a perceived invasion of privacy.

There is an untapped opportunity in the wireless to web market—delivering the ability for mobile devices to capture location-specific or general information, for later retrieval via the web. There is an opportunity for an indispensable service for a user not wanting to respond to information while mobile, but who wants the ability to retrieve it at their own convenience.

We all have driven by a store or a sign and in which we were interested, but didn't have time to stop to enter the store or write down the web address or the telephone number. How many times have you sat in doctor's offices and seen an ad that you wanted to remember? How many times have you seen magazines in those offices with pages torn out? All represent the need for mobile electronic information storage.

An additional problem is that current search engine technology is limited to only 15% of websites are listed on any given search engine which makes the odds of actually finding the site very slim, according to Search Engine Report. This will become more cumbersome for mobile users desiring to search for a particular website on smaller devices. By capturing the information immediately, consumers can link directly to a website without having to wade through the long lists of search engine hits to find the exact destination. If a company has a large product line, even navigating within their corporate website can compound the search for specific information within a website.

Figure 8:
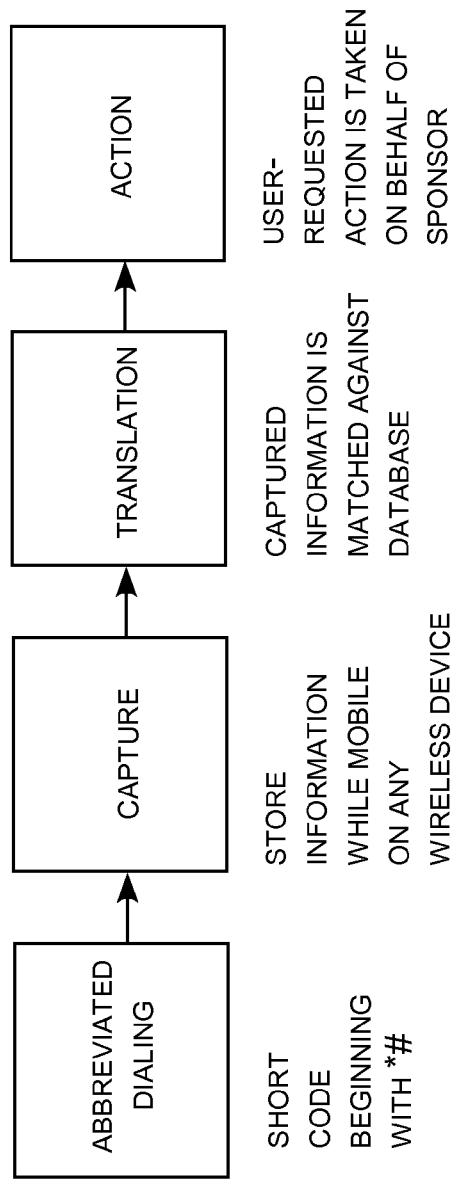
FIG. 8 is a block diagram illustrating a conceptual overview of the telecommunications initiated data fulfillment system.
Figure 9:
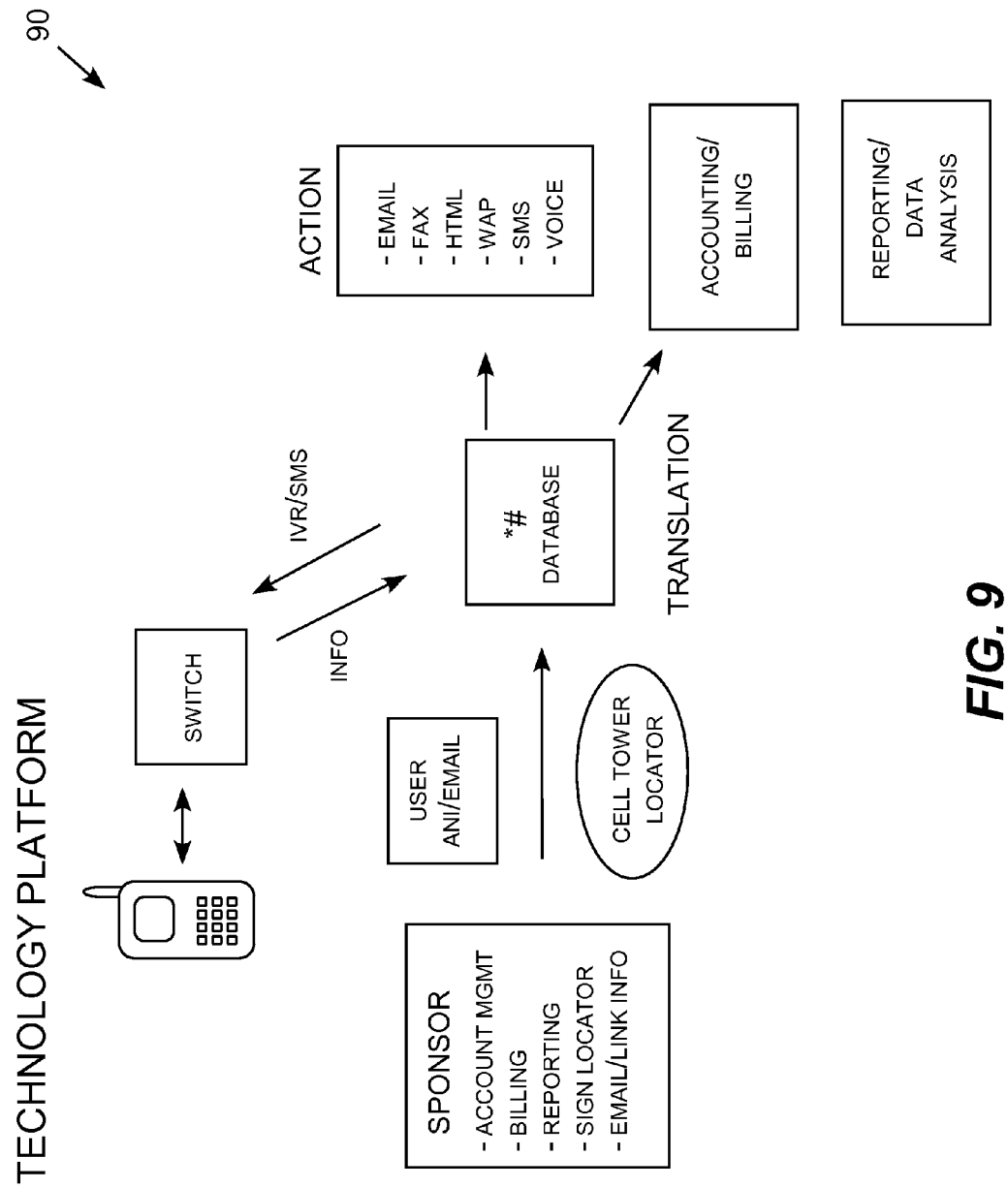
FIG. 9 is a block diagram of an illustrative technology platform for implementing the telecommunications initiated data fulfillment system.

If an application or content provider desires significant market penetration, their product must be compatible with existing cell phone and PDA technology to benefit a majority of the existing market penetrated by these devices. The biggest barrier to mass-market acceptance in the mobile space is a cumbersome device or a lengthy process. Consumers do not prefer to carry multiple devices, nor will they accept inconvenient processes to store information. The cell phone is the most ubiquitous and easy input device in the market today and requires a solution that shortens the input string to *, #, and digits, allowing for easy input by a user. Longer strings jeopardize the user's ability to memorize the string quickly and prohibit quick entry. Technology Overview—FIG. 8 is a block diagram 80 illustrating a conceptual overview of the telecommunications initiated data fulfillment system. High Level Diagram and Process—FIG. 9 is a block diagram 90 of an illustrative technology platform for implementing the telecommunications initiated data fulfillment system.

A mobile, wireless device user will be able to request a specific action or information fulfillment via their device by entering a multi-function key dialing prefix (any combination of * and #) and a specific abbreviated dialed string labeling the object for further requested information or action. The dialing prefix and dialed string may be entered via Voice Activated Dialing, manually, or automatically. The code labeling the action may be placed in any advertisement, notice, and print media, on a person, place or object. The action may be information fulfillment, scheduling of events, purchase, notification of third party, transfer to call-center, or automated response. The delivery of information or action may include, but not limited to email, fax, website, voice, third-party platform (interactive TV, Pay-for-View, Music Sampling/Ordering, Kiosk, Point-of-Sale), or back to the wireless device via XML, W AP, HTML, or other standard.

By prefixing an user-dialed string with a multi-function key prefix entered into any wireless or mobile device connected to wireless network, a wireless switch will be able to translate this code into a forwarding action to a third-party platform. This will be done over a data network in order for the platform to fulfill a user or third-party requested action or to forward to another platform the specific action/information request with the identified user information to complete a user-requested action or information fulfillment. The platform will then enable a contact via SMS, W AP, voice, email, or instant message confirmation that the action has been completed.

The wireless switch will forward the following information: MIN—mobile identification number; Calling number; Dialed string (calling number, though no call is enabled over the network); Wireless Cell Tower Identifier (base station ID or cell ID); Exact location identifier within the wireless service provider's grid system; Customer Demographic/Account information; Wireless provider ID; Wireless Device Capabilities (i.e., WAP-enabled).

The platform will store the above information into a database with the demographic/contact information of the user. Additionally, this database will also store a grid system that overlays a single or multiple providers' networks. This grid system(s) will map the Cell Tower ID from the wireless service provider's network, the coverage area of the cell tower's signal, Global Positioning System(s) or other location mapping system(s), and street mapping system(s). This will enable objects (specific multi-function key prefaced dial strings) to be coded to the specific cell tower(s) that will be likely to receive the request for action. This allows for localization of response and development of a coding system based upon a) location, b) specific user, and c) user requested action (input of specific multi-function key prefaced dial strings).

The platform will also be able to provide specific analysis and measurement of response regarding the location, users, frequency, and demographics of the users. There are several ways the platform can capture the specific delivery channel the user has requested: Third-party database matching wireless device ID to preloaded user demographic/contact information and response preference; Integrated Voice Response System that can capture the delivery destination information (including, but not limited to email address, account information, telephone number, wireless phone, kiosk, POS, third-party account ID); Wireless service provider sends user contact information with the other information at the time of request; User provided information via website or email prior to usage; User retrieves information via website by entering wireless device ID.

Detailed Process Overview

Abbreviated Dialing.

1. User enters multi-function key dialing preface and a specific abbreviated dialed string labeling the requested information or action on their wireless cell phone, key into the "to:" field on their email interface for their PDA or 2-way pager, or speaks into the Voice Activated Dialing interface to dial.

2. User hits or speaks send/enter/dial on device to enable connection to the wireless network.

3. The event triggers a request over the signaling channel to the switch to confirm MIN is valid and how to route the dialed telephone number.

4. The translation table or HLR is pre-registered to not enable the call and triggers a specific voice message back to the handset with a special announcement.

Capture

1. A. The wireless switch infrastructure triggers record containing certain call information via the API sends the dialed string, calling number, cell tower ID, wireless service provider ID, and other relevant information to be sent to a certain IP address representing a server on Starpound's network.

B. The wireless switching infrastructure forwards records via the API sends the dialed string, calling number, cell tower 10, wireless service provider ID, and other relevant information to be sent to a certain IP address representing a server on Starpound's network.

C. The wireless switching infrastructure is polled by an application running on a certain IP address representing a server on Starpound's network which sends a request that triggers record containing certain call information via the API sends the dialed string, calling number, cell tower ID, wireless service provider ID, and other relevant information.

2. The interface server searches a database to see if the record represents a known MINIUser.
   A. If the MINIUser is known, the interface server will forward information to the database server with record information.
   B. If the MINIUser is not known, the server will forward information to the database server by creating user account with record information and will trigger one of multiple responses:
      1. IVR—triggers message to call to user from IVR system, capturing user email address
      2. W AP—triggers response to W AP gateway
      3. SMS—triggers response to SMS gateway
      4. Call-center—call from call-center requesting information form user
      5. Pass—will create new user record Translation
1. The database server matches the information to pre-registered map of cell towers, and user demographic and requested information to enable delivery.
   A. Mapping Wireless Provider(s) cell tower IDs and cell map with a street map creating a super grid system which maps all on a master map.
   B. The master map will contain an algorithm to determine overlapping cell tower's cells and take that information to create a database system whereby a number assigned on a street map will automatically update the overlapping grids.
   C. Advertiser signs are given unique IDs based upon available numbers in each grid due to mapping the sign's street address to the master map and assigning an available ID in that grid and the overlapping grids, if applicable. At this point, the sign ID, advertiser account ID, and the associated cells are updated in the database server.
   D. Advertiser account registration and sign registration
      1. Create Advertiser account capturing the following information:
         a. Contact name
         b. Address
         c. Contact email
         d. Ad/campaign name
         e. Campaign coverage area
         f. Length of campaign
         g. Campaign locations
         h. Out-of-home media provider
         i. Billing info
         j. Plan type
      2. Post message
         k. Submit message
         l. Submit graphics
         m. Submit link codes
      3. Obtain Starpound number
         n. Get number
         o. Approve contract
         p. Modify Account
         q. Post new message
         r. Delete message
         s. Modify message
         t. Target message
            1. By user
            2. By time of day
            3. By location
            4. Other metric
   4. Bill payment and credit card registration
      A. Advertiser enters credit card, the database server updates the account in the database server or process through the credit card server
      B. Pay Bill
         1. Review invoices
         2. Contact billing dept
         3. Post billing documents
         4. Exchange billing documents
   2. The database server will match the record's MIN and the MIN database to find the appropriate user, then the database will match the dialed number and cell tower ID to the sign ID and cell tower ID database and update the user's record with the advertiser ill and the appropriate action type identifier.

Figure 10:
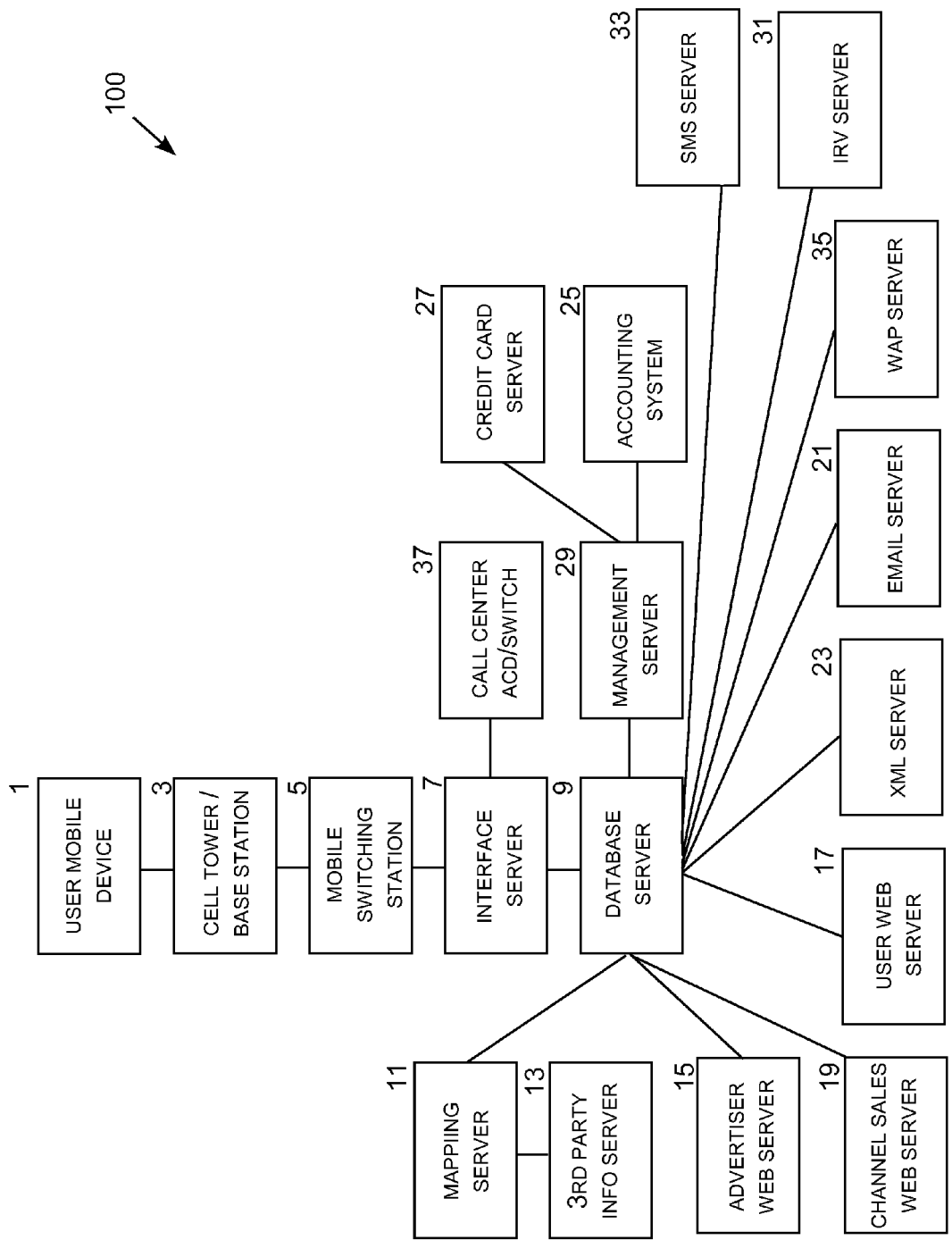
FIG. 10 is a technical diagram of an illustrative implementation procedure for the telecommunications initiated data fulfillment system.

Action
1. The database server will then trigger the fulfillment of the action:
   A. Email—text, attachments, links
   B. XML—forward information to portal or third party platform with relevant information: sign ID, action request, user MIN
   C. HTML—Starpound website
   D. W AP-W AP gateway using user MIN
   E. Voice—IVR system call user
2. The platform will deliver the dialed string ID owner's information to the user requested delivery destination and in the format requested.
   A. The platform will provide information regarding the macro statistics and micro statistics (without violating stated confidentiality rules) to the dialed string owner, channel sales partner, and wireless service provider.
   B. Reports
      1. User profile reports
         a. Manage profiles
         b. Rank profiles
      2. Time and location
      3. Quantity
      4. Closed transactions
      5. Coverage maps
      6. Export information to desktop
      7. View forwarded messages Post Processing
1. Billing and Accounting
2. Customer Service Technical Diagram. FIG. 10 is a technical diagram for an illustrative implementation procedure 100 for the telecommunications initiated data fulfillment system.
1. User Mobile Device—using a cell phone or other mobile device, user inputs dialing prefix and identifier code, and send.
3. Wireless Service Provider cell tower/base station—network routes request for connection to MSC.
5. WSP Mobile Switching Center—MSC translates dialing prefix to specific action which is to forward specific information through the API and triggers response to user confirming request.
7. Interface (API) Server—Captures information, looks up if valid user ID, enables capture of account information if not pre-registers, and updates database server with specific information.
9. Database Server—takes user request information, maps the request to identify which ID the user requested, and coordinates delivery to account information.
11. Mapping Server—maps the cell-tower/cell map to the street map to the sign address and outputs the exact location of the sign based upon the identifier of the cell tower, advertiser, and sign.

13. Third Party Information Servers—advertiser updated account, purchase, and delivery information.
15. Advertiser Web Server—interface for advertisers to manage account.
17. User Web Server—user to manage account and delivery information/formats.
19. Channel Sales Web Server channel partners can manage channel relationships and provides tools to develop sales.
21. Email Server—Emails and attachments are sent via this server.
23. XML Server—interface server for third-party platforms or websites, also handles security with partners' platforms (information, account, or purchase requests).
25. Accounting System—billing and accounting.
27. Credit Card System—processes credit card transactions from advertiser purchases.
29. Management Server—controls platform and handles reporting for internal and external information and platform security.
31. IVR System—handles capture of user delivery information for registering account or handles text to speech for information delivery.
33. SMS System—delivery of information via short messaging through interface to wireless providers' SMS gateways.
35. W AP System—delivery of information via short messaging through interface to wireless providers' W AP gateways.
37. Call Center ACD/Switch—routing help requests and live capture of user delivery information if required.
Product Requirements
  1. Switching Requirements
    Translation on Switching Center
      *# Automatically triggers event, but does not complete call
    Capture of Digits, ANI, and Cell-tower Identifier
      Switch or Intelligent peripheral is designated for API
  2. Wireless Network API
    Routing of Information to Platform
      Near real-time
        Pull and Polling—simpler polling of a device on a periodic basis for records, easier to implement if real time not available already
      Real-time
        Event—switch or Intelligent peripheral pushes records as events occur—may require additional programming, depends upon existing record management at switch, may be available
    Security
      Switch—must respect service providers' security protocols
      IP delivery simple encryption 128 bit is sufficient since data size is small
    Confirmation—both sides of API
  3. Notification
    Switch Message—voice recording triggered by translation table "your request has been sent"
  4. User Registration
    Voice—Requires intelligent peripheral in SS7 network that requires lookup every time with each service provider to determine if account not provisioned, then request to switch to route to IVR system.
    IVR
    Voice Recognition
    Operator
    Pre-registration
      Wireless provider
        ANI, email, account ID, zip code and demographic information if possible
        Billing statement inserts
        Direct email to WP user base
      Starpound
        Events—drive demand
        Website—fulfill at website, post-request registration
      Third-party Databases
  5. Database Management
  XMLI API for internal and external interface management
    Business Objects
    Database
  Advertiser Fulfillment Information
    Multi-delivery format
    Media asset submission
    StoragelModificationlRetrieval
    Search
  Advertiser Account Provisioning
    Account
    Billing
    ID assignment and selection
    Sign Locator
  6. 3rd party Information Databases
  Geo-positioning
    Cell tower Map and ID
    Sign Location
    Street map
  7. Delivery
  Email (On-demand retrieval)
  XML (Intelligent formatting)
    W AP (send information to Gateway)
    SMS (send information to Gateway)
    Kiosk (send information to Gateway)
    POS (send information to Gateway)
    I-TV (send information to Gateway)
    Portal (supports third-party websites)
    API (Business applications and other gateways)
  HTML (Web formatting)
  Fax (Literature fulfillment)
  Voice (Customer support)
  Audio (Fulfillment, Transfer, Download, MP3)
  8. ReportinglData Analysis
  XML
  HTML
  Reports
  Data Mining
  9. Billing, Accounting, and Credit Card
  General Ledger
  AIR—monthly billing
  Credit Card Server
    Immediate
    Monthly
  10. Customer Care
  Advertiser
    Account
    Billing
    Provisioning
    Suggestions/recommendations
    Troubleshooting
    Fulfillment Materials User
    Provisioning
    Link tracking
        Forwarded
        Purchases
        Requests
    Suggestions/recommendations
    Trouble Shooting
    Account Maintenance
Wireless Provider
    Inquiry Support
    Switch status
    Deployment status
    Revenue tracking
    Usage
Channel Sales Support
    Inquiry support
    Referral center
    Usage
    Commission tracking
11. Third-party interfaces
Advertiser
    HTML
    XML—private labeled
Channel Reseller
    HTML
Wireless Provider
    HTML
User
    HTML
    XML—private labeled
12. Hosting
Security
Location
Failure
    Redundancy
    Disaster Recovery
    Monitoring
13. Platform
Scalability
Backups
Redundancy
Monitoring
Storage
Hardware
    Web servers
    Network servers
    Email servers
14. Special Functions
Purchase
    Access Code
    Account
Wireless Sign location registration
    Access code
    Account
15. Numbering Schema
Vanity ID (1-3 digits)—The prime real estate in wireless abbreviated dialing is a *, # single digit ID that can be provisioned on every switch in Starpound's coverage area. A consumer brand-conscious company will desire to allow mobile users to instantly respond to out-of-home marketing.
Fixed ID (4-5 digits)—These numbers are localized to a particular location and are used for local signage advertising. Examples are billboards, outdoor signage, stadium signage, retail location signage, and restaurants.
Universal ID (6-8 digits)
    6-7 digits—Print media or regional out-of-home advertising and can be used for mobile advertising, print ads, or any multi-location advertising.
    8 digits—Personal IDs for electronic business cards or personals/dating screening.

Figure 11:
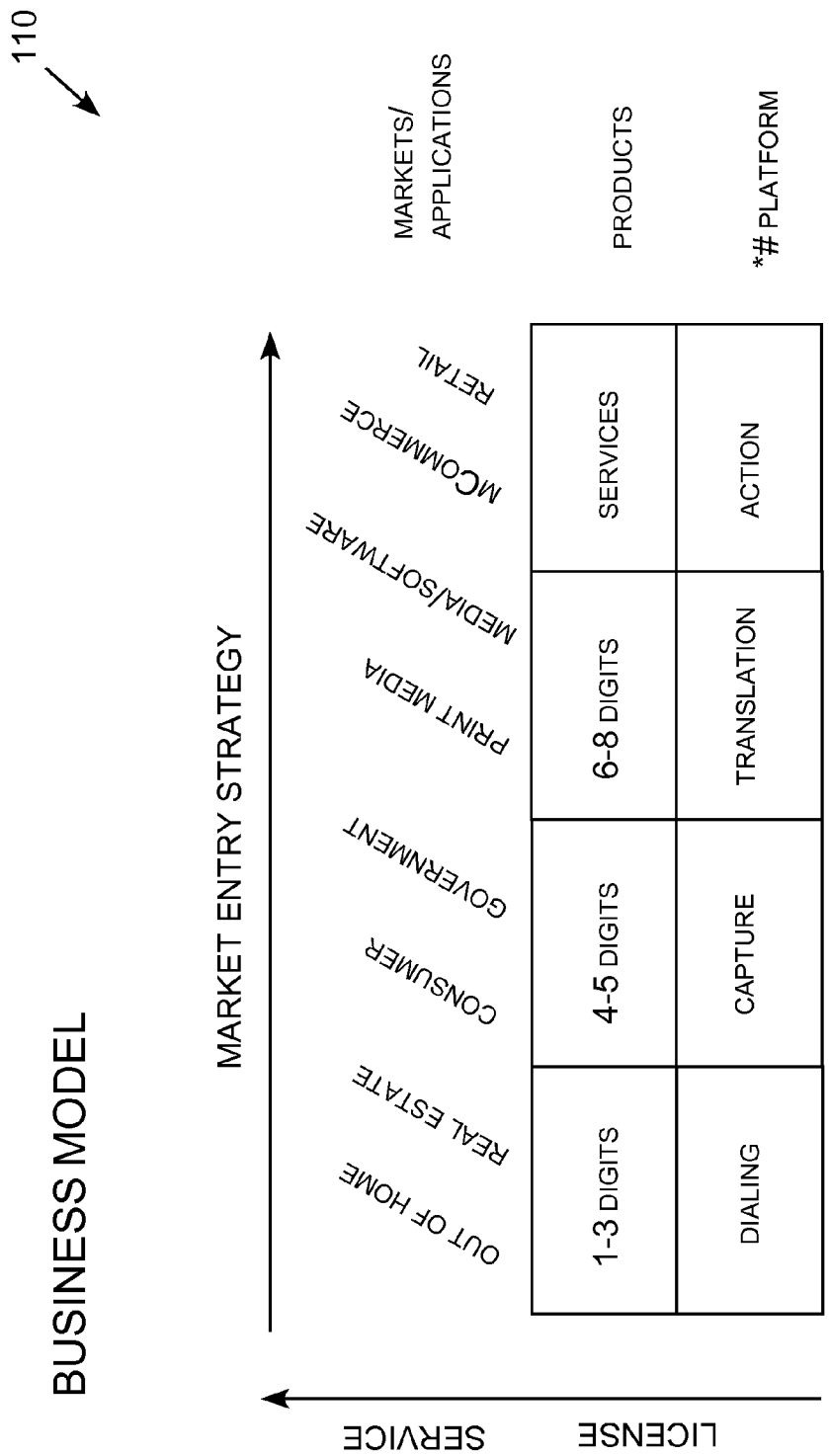
FIG. 11 is a conceptual diagram of an illustrative business model for the telecommunications initiated data fulfillment system.

FIG. 11 is a conceptual diagram of an illustrative business model 110 for the telecommunications initiated data fulfillment system.

Out-of Home Advertising Example. By labeling a sign with a dialing prefix and multi-digit ID that localizes responses, an advertiser can make it easier for a prospective customer to respond to a billboard, sign, magazine ad, or radio spot. The advertiser can showcase a particular product, localize advertising to neighborhoods, or develop a segmented marketing program. The advertiser can place the code on all collateral, out-of-home advertising, media advertising, and radio spots. The advertiser can run instant, localized promotion and awareness campaigns. This can be used for promotions, coupons, menus, product information, community notices, etc. The delivery methods may be to email the information to the user specified email address, fax the information, text to speech, pop a WAP screen on the user's phone, web retrieval, enable purchase, or forward to third-party partners' platforms for additional actions to the user's account (such as scheduling, purchasing, couponing, or account management).

Advertiser Benefits
    Dialing prefix and (1+digits) anywhere to reach advertiser
    Localized promotions and product introductions
    Localized or neighborhood marketing
    Reconcile each response to source of response
    Enables easier recall and instant response
    Unobtrusive marketing (reactive response)
    Key marketing differentiator is to tie brand with better recall, response, and measurement
    User's find the system convenient because it meets their needs for information request immediately and ensures the exact information will be available where, how, and when they need it.

Real Estate Example.

The process of uploading and maintaining residential or commercial real estate listings online is cumbersome and difficult if the agent uses a website. More commonly, prospective home shoppers are forced to call the phone number on the real estate sign to ask for details or request a fax, or scroll through listings online. By enabling a simple, automated email response, the agents can provide a complete listing of information available to the buyer more efficiently. The agent simply places the dialing prefix and single or multi digit identifier code number on the sign and then prepares the information for email or other delivery. Each listing is individually tagged so prospective buyers can instantly request information on each property at their convenience.

Benefits
    *, # (4 or 5 digit) anywhere to reach individual listing
    Enables easier recall and instant response
    Qualifies responses
    Automates qualification process
    Saves agent time used to qualify leads
    User's find the system convenient because it meets their needs for information request immediately and ensures the exact information will be available where, how, and when they need it.

Additional Application Examples

Government/Community—enables government or community notices or signage like zoning notices or community information notices to allow users to receive additional information or enable actions such as voting.

Consumer—enables consumers to have a personal identifier number which they can use as an automatic link to their personal home-page or communications cockpit for business or personal (such as dating).

PrintlMedia—enables a code to identify a company or particular ad to email the information to the user specified email address, fax the information, text to speech, pop a WAP screen on the user's phone, web retrieval, enable purchase, or forward to third-party partners' platforms for additional actions to the user's account (such as scheduling, purchasing, couponing, or account management).

Media/Software—enable action such as updating software on-demand, downloading music or video, or managing accounts.

mCommerce—by entering a dialing prefix, identifier code, and a pin code, a user can enable purchase off a pre-registered account or can trigger launch of a WAP interface to enable purchase via the interface for purchase.

Retail—the ability to look up additional products or shop using a mobile device and a UPC code.

Process—Labeling outdoor/location signage with dialing prefix (numerical or key word) and a single or multi-digit code to be entered in wireless phone, pager, PDA, 2way pager, or other mobile device, translated onto the switch, and forwarded to a platform to fulfill the requested action; either request for information or specific action such as purchasing, scheduling, couponing, etc.

Dialing—Multiple function key dialing as dialing prefix via manual, directory, or voice for routing over wireless and fixed voice or data network routing. Entering multiple function keys as routing instructions for the switch translation tables to enable specific action is unique. Today, they use single function keys as abbreviated dialing, but do not use multiple function key dialing prefix, specifically, they use function key dialing only to complete a call, not to enable additional actions like transferring the information to a platform. The benefit of using multiple function keys is that the translation of the digit code after the dialing prefix can be done outside of the wireless provider's network and therefore can be updated faster and easier because each switch in the wireless provider's network does not have to be update with each digit code, only the translation for the dialing string. Additionally, with multiple function keys as a prefix, more numbers are available. Single function key require each wireless carrier to provision every number (for example *#1245 and *#548375) onto every switch because they are already using single function key dialing for abbreviated dialing for voice calls. By using a multiple function key prefix, all individual dialing string routing after the dialing prefix can be captured and fulfilled by a platform. This creates a standard for variable length dialing strings to enable coding of both fixed location and multi-location using multi-function key prefix to create universal system for user requested information via wireless voice and data networks. Response from entered dialing prefix and a single or multi-digit identifier code over network to trigger WAP, XML, HTML or data interface launch on the mobile device. This could be a website, purchase screen, account screen, coupon, or information portal.

Enter dialing prefix, single or multi-digit identifier code, and password identifier number (pin code) to enable purchase using a pre-provisioned account for purchasing.

Mapping—Geographic positioning and mapping system using wireless networks, wireless cell towers, and other GPS-like mapping systems to determine location of objects. The E911 laws are forcing carriers to map location of users for emergency services using GPS and speed/distance from cell tower location based mapping systems, but this only locates users and does not map objects. By labeling objects with a specific code and using a dialing prefix, objects can be coded and the specific object that the user desires can be mapped. By labeling a fixed location object, a user can then identify their location to that object for further action. By mapping an object to a specific location or grid, the object identifier grid system can be much smaller that traditional grid systems such as area or zip code. By localizing object mapping and using the wireless infrastructure, the grid system can shorten the object identifier to less than 5 digits, but remain universal throughout the planet.

Response—Interactive advertising response system using abbreviated dialing system (dialing prefix via manual, directory, or voice), switch translation, wireless cell-tower mapping or GPS, and platform to capture user-requested, location-specific information in response to advertising over data networks. Current patents claim abbreviated dialing for connection over PSTN, this allows for transfer over data networks without requiring transfer to PSTN or completion of call since this process captures information via a switch and does not complete a call. This process is unique in that is allows for a wireless user to request information about a specific object at a specific location with a cell-phone.

Routing—User-determined soft switching via wireless network separating routing over network based upon presence of dialing prefix. By entering a multi-function key dialed string (dialing prefix) or key word via manual, directory, or voice, the user can select the purpose of usage over wireless provider'S network; internet, communication via voice, communication via text, or voice, video, or text messaging using the same data or voice network. This is unique in that today, the methodology is to complete a call or to specifically enable a data connection via the wireless device, but not to be able to allow the user to determine the format and method of information delivery (messaging) and real-time communication. By enabling user requested functionality, legacy switches can route special function "information actions" through a data network to a platform to fulfill the user requested function while maintaining the existing wireless network for voice traffic.

Individual ID—Using double function dialing prefix with a single or multi-digit identifier code that enables individual coding which can be used in both wireless, data, and PSTN networks to create a super ID that is tagged to an individual and super-imposes over all device IDs the individual may possess, but is short enough to memorize for the general population (less than 10 digits beyond dialed prefix). This is unique in that it can represent both messaging and real-time communications contacts so that voice, data, video, text, and other forms of communications can reach an individual represented by this ID, not just wireless and PSTN calls or voice messages. Additionally, this number can be entered into a myriad of devices such as a wireless phone, PDA, PSTN phone, 2-way pager, web or IP-enabled device, or videophone.

Universal Communications Assistant—Using individual ID system (claim 8), a user may enter someone else's Individual ID via manual, directory, or voice, into their cell phone and have that person's individual homepage be delivered via but, not limited to email, web, XML, or WAP. The individual's homepage can contain any information the individual wanted to present, but will also contain a "communications cockpit" which will enable the user to contact the individual through both voice and data means and through any device the individual has tagged under his/her universal ID communications umbrella which may include printers, vehicle communication, or home communication devices. These device IDs can be hidden from the user thereby eliminating need to list multiple contact numbers or addresses and protects anonymity. The individual will also have the capability of determining rules for prioritizing, filtering, screening, and routing real-time communications and messaging via, but not limited to voice, email, fax, instant messaging, data, W AP, XML, HTML, and file transfer. This is unique in that universal messaging and single number services exist, but are not combined to provide a complete communications and messaging solution for individuals. This combines the capabilities of both one number services and integrated messaging, but covers both voice and data communications, enables rules to be built governing when, where, how, and who can communicate with the individual using a myriad of different communications and messaging capabilities while being able to prioritize and select the best method available with the technology to reach to individual from any device that is connected to a wireless, wired voice, data, or IP network. Example—an individual is sitting at a ball game at 6 PM on a Wed. A user decides to contact the individual for the first time by entering the Universal ID for the individual. The platform enables a W AP screen pop of the individual's homepage on the user's W AP enabled wireless device and offers the user the ability to communicate with the individual in a myriad of ways:

Tag delivery as urgent, normal, or later delivery
Real-time via voice, video, or instant messaging
Messaging via voice, email, fax, video, or text
The individual will have the capability of setting rules to determine:
  Time based filtering and screening
  Priority filtering and screening
  ANI/Universal ID of individual contacting filtering and screening
  Real-time filtering and screening
  Dynamic routing of contact
  Translation text to speech, speech to text, and video to voice
  Prioritization of reception device based upon all above (after 6 PM all contacts are messaging to 2-way pager, but if "wife" (Universal ID *#1234567891) or recognized universal IDs marked "urgent" contacts, send to cell phone, if that does not answer send to home phone, if no answer, send to 2-way pager.

The invention creates an infrastructure that triggers and measures sponsored events. This enables mobile users to respond to information and retrieve it conveniently via the Internet. This is accomplished by entering a simple numeric code on any wireless device.

Mobile audiences are overwhelmed with messages from sponsors seeking their attention. These sponsors spend heavily to gain attention, establish dialogues, distribute content and measure interactions with customer populations. An opportunity exists, utilizing common mobile devices, to intuitively trigger, engage and quantify interactions between sponsors and their audiences to the benefit of the users and the service provider.

The invention will penetrate multiple vertical markets, starting with the lucrative Out-of-Home market. Sponsors in this vertical spent more than $5.2 billion in 2000 for Outdoor Media (*Outdoor Advertising Association of America*), more than $15.4 billion in 1998 for Radio Media (*Radio Advertising Bureau*), and more than $2.1 billion for residential Real Estate Media (*National Association of Realtors*). When audiences are interested or engaged in these messages, they do not have an easy way to "capture" information and review it at their leisure. For sponsors, there is no accurate way to measure any response to Out-of-Home Messaging, much less leverage trending and information analysis to enhance customer relationship management (CRM). However, with 36% of the US population today using wireless devices—61.5% by 2005 (*Forrester*)—an opportunity exists to capitalize on this unfulfilled need.

The solution is an infrastructure that permits any wireless device user to simply enter *# and a numeric code, which is translated into rich content via email, the Web, or back to a phone via voice, SMS or WAP. The invention enhances message recall, enables immediate response and provides invaluable measurement for sponsors by providing wireless users a convenient and easy way to respond to messages while mobile. Resulting data is filtered and interpreted for the benefit of Wireless Provider Partners, Sales Channel Partners, Sponsors and Mobile Users.

The technology leverages the existing infrastructure of wireless providers (network agnostic) and utilizes readily available hardware (device agnostic). Sponsors will license Starpound codes to be embedded within messages and media to permit user response via any wireless device. The system charges a recurring fee for use of these codes. Additionally, the system will charge for each inquiry that is fulfilled on behalf of the sponsors. The technology will also recognize a critical revenue stream from development of data warehousing capabilities to store, interrogate and analyze end-user responses. Further, it intends to investigate revenue from the design of interfaces with the customer management systems of partners. The technology will target customers first on a local/regional (DMA) basis, then nationally, then on an international basis.

The technology will allow wireless device users to capture information while mobile, and conveniently retrieve this information via the Web. There are currently more than 570 million mobile phones in the world today (Business Week, Oct. 26, 2000), and there will be more than 1 billion worldwide mobile phone users by 2003 (The Yankee Group). Mobile phone penetration rates in the U.S. will reach 61.5% by 2005, up from 36% today (Forrester). A primary value proposition of the Starpound solution is the ability for users to pull information via the Web using current and future mobile device technology. While many analysts predict that most phones will soon be able to access the Wireless Web (The Yankee Group predicts that by 2003 about 60% of mobile phones will be capable of receiving wireless Internet), mobile device churn has been slower than expected. Many in the industry expected consumers to change cell phones every 18 months, much like they do with other electronics devices that offer rapid, dramatic improvements. Instead, the duration between new handsets has been closer to every 22 months according to research firm Strategy Analytics, in part due to large monthly wireless bills that cut into consumers' discretionary spending.

Out-of-Home Market. While there are countless vertical markets to leverage the Starpound infrastructure, the system will initially target the Out-of-Home vertical. A significant portion of this market is comprised of the outdoor advertising (billboards, posters, vehicles) category. Instead of trying to remember a sponsor's telephone number or lengthy URL while passing a sign, a wireless device user will be able to capture this information by simply entering a short numeric code into a device. The user can then conveniently retrieve rich content designed by the sponsor when and where they choose, at a time more likely to engage or capture interest. This business proposition will allow these sponsors to benefit from the increased efficiency of the Internet-based system including: generating increased consumer recall, qualifying leads efficiently, and an unprecedented measurement and analytics system that supports sponsor CRM objectives. The Out-of-Home market continues to realize steady growth. Total U.S. revenue in 1999 was $4.8 billion, an increase of 9.4% over 1998. In year 2000, thus far, there has been a 14% gain over 1999 spending, with anticipated total annual revenue of $5.2 billion, according to the Outdoor Advertising Association of America.

Radio Market. Another significant vertical is radio. Radio is a selective medium that is mobile and intrusive. It provides access to 75.2% of US consumers 12 and older daily and reaches 95% of consumers weekly, according to the Radio Advertising Bureau (RAB). In addition, RAB states that radio reaches 81.2% of adults 18 and older in the car each week, 24 hours a day. The effectiveness of radio may also be demonstrated by increased spending on advertising. In 1998, ad revenues for radio climbed 13% to a record $15.4 billion, up from $13.6 billion in 1997, also according to RAB. These figures indicate reliance on a medium that can be dramatically enhanced and measured with Starpound's simple call to action. Enhancement of direct response leverages the mobility of radio listeners, as well as the common wireless devices they possess.

Real Estate Market. An additional vertical to leverage the Starpound infrastructure is real estate. Realtors and agents can post a Starpound code on a For Sale sign, and a house-hunting mobile device user can pull a property description or virtual tour to their designated email. Real estate brokers and agents nationwide spend approximately $2.1 billion annually on advertising properties they have for sale, and almost 100% of those properties are also listed via the Internet. Within the state of Georgia, Starpound's initial target market, the 41,000 licensed brokers spend approximately $62 million annually on promotion (National Association of Realtors).

Additional Vertical Markets. The technology provides great opportunity to launch in further vertical markets to protect its speed to market and its intention to grow quickly. After experiencing successes as intended in its initial applications, the additional relationships and revenue are expected to develop in:

Print—Starpound codes are ideal for responding to Classified and other types of print advertising.

Interactive Television—Starpound codes can make schedule or preference changes on ITV boxes, acting as a distant "remote control".

Trade Shows—Starpound codes can correspond to booth numbers, satisfying the need of travelling professionals to request more information—without carrying it back physically.

Retail—A shopper can Starpound a UPC or SKU code to get product information in their hand.

Vending—Starpound codes can initiate a micropayment from a preferred vendor and then signal an installed telemetry device to drop a product from a vending machine.

Mobile Commerce—Starpound codes can immediately request software downloads, schedule conferences, or request audio/video media to wireless devices, as well as initiate payment.

Unified Messaging—Starpound codes can be used as a "Super ID" for messaging and real-time communications contacts so that voice, data, video, text and other forms of communications can reach an individual represented by this ID.

Sponsors may now make it extremely simple for a prospective customer to directly and immediately respond to a call to action on a billboard or poster, by labeling these signs with a Starpound number. Once a number is entered, this simple call to action may be translated into rich fulfillment of targeted information based on the user's location, ID, profile, time of entry, or other targeted metric.

The sponsor can showcase a particular product, provide localized responses based on area, or develop a highly segmented marketing program. The sponsor may update content for fulfillment instantly, via the web, allowing for unlimited flexibility in creating localized promotion and awareness campaigns. The benefits of such campaigns to sponsors include enhanced recall, response and measurement. The benefits of such campaigns to users include access to branded content leading to acquisition of promotional items, coupons, menus, product information, contests, sneak previews and more.

Content is set by default to be delivered via email, but may be customized to deliver via fax, audio, interactive content on a user's phone, or web-based information. In addition, further activities can occur as fulfillment to facilitate spontaneous sales or impulse purchasing.

Starpound activities are highly measurable. The company's services provide detailed reporting, analysis and trending for typically difficult-to-measure media. In fact, data gained from interactions from Starpound-enabled Out-of-Home media may change the way it is purchased and used. First, it turns a medium used today for branding and awareness into one of pinpoint direct response. Second, it enables sponsor segments who typically do not use outdoor (such as pharmaceutical companies) to leverage new means of distributing informational content (i.e., to get info on new drugs or medicines for allergies).

Radio Services—Radio sponsors may now more effectively leverage calls to action in their campaigns than what listeners have previously been able to act upon. Much time in commercials is devoted to repeating phone numbers, or lost on lengthy URLs. The highly mobile radio audience may now use their handy mobile devices to immediately respond to radio ads within seconds, and get rich information and content at a time convenient to them. The benefits of recall, response and measurement work identically as stated for Out-of-Home, and will serve to enhance a medium that has little or no direct response capabilities today for the mobile audience it serves. By increasing the efficacy of this ad medium, Radio Stations can sell more advertising and those sponsors can more dramatically increase the impact of their ads.

Real Estate Services—Today, prospective home shoppers are forced to call phone numbers on real estate signage to request details about homes or to request a fax for more information. In addition, home shoppers may be directed to listings online by a sign that is nowhere near any Internet-enabled device. Now, by providing a simple, automated email response via a Starpound number, an agent can provide a complete listing of information available to the buyer in a more efficient manner, or even deliver a virtual tour of the home. The agent simply places the Starpound number on the sign and then prepares information, typically already on the Web, for immediate email or other delivery. Each listing is individually tagged so prospective buyers can instantly request information on each property, and then review it at their convenience. The benefits to agents are significant: Get more information to more people without stretching their personal resources, know who is requesting it, and use the power of the Web to show similar properties according to user-specified criteria. The benefits to the user are equally as strong: get "inside" the house fast, get as much info on interesting properties as conveniently as possible, and do more on a single house-hunting expedition.

Additional Services—The technology provides the ability to enhance the CRM objectives of its customers by providing interpreted data. Such data would contain a uniquely "complete" picture of users, in that it would consider location and experience of response correlated to demographic data and resulting web fulfillment behavior. The technology also provides value in providing opt-in benefits to users, so that customers may continue to use the benefits of direct e-mail marketing to cross-sell and upsell specific populations. This service remains undefined until a defensible privacy practice and substantial user activity has occurred.

When the technology enters a market, such as Atlanta, it creates partnerships with leading wireless providers to enable its direct-response email fulfillment service on their networks. These providers recognize that they can drive demand if more people use their networks, and they see the Starpound service as an effective way to increase traffic through a beneficial service that does not tie up networks with voice calls and provides valuable data on customer behavior. Starpound works with its provider partners to first make the service functional, and then to inform customers of its availability.

People hear about it. Users of partner networks are invited to sign up to use this simple, remarkable Starpound service 90 days prior to when it is launched. They receive messages in billing statements, through on-hold messages when calling wireless providers for service or account issues, in retail outlets maintained by the providers and through radio advertising co-sponsored by Starpound and its provider partners.

These messages explain that an anonymous, private, free service is coming. It permits anyone to identify themselves by their current email user name (or choose another) to quickly: buy tickets, get deals or savings, request downloads, view online sneak previews or obtain information—coming soon for radio, billboards and real estate signs. Its as easy as "dialing" an email and getting it on-demand, and this is wireless instant gratification.

Signups occur on the web sites of wireless provider partners. The sign up portion of the site is collectively maintained by Starpound and each partner, to grant Starpound access to only the information it needs. Users are asked to enter their email address, cell phone number, and to choose a PIN. Once this data is entered, it is all that is required to provide service to any user when the Starpound service is launched. While other information is requested, it is not required to use the service. This information may be updated at any time via the Web.

Users do not need to sign up in advance to use the service. It pops up in Outdoor, on the Radio and on Real Estate Signs. Launch of the service occurs when sponsorship customers of Starpound utilize these short, simple codes as calls-to-action in their promotional efforts. The service provides increased recall, response and measurement to advertising customers, which is why they want Starpound numbers.

They realize that people who can quickly dial a simple number will want to do so if it can be instantly translated into rich information or deals meaningful to them. In addition they want to know what kind of people are responding to these previously-difficult-to-measure types of advertising. They can personalize messages based on the location, ID or preferences of each caller, and can leverage the rich interactivity of the Internet to maximize convenience and impact. Above all, each interaction can provide valuable data to the sponsor about what customers want. This leads to more customer acquisitions, higher customer retention, and more meaningful ways of driving brand awareness.

People can use it. The process is extremely simple. A mobile user is driving to work and passes a billboard or hears a radio commercial for a new Martin Scorsese movie. While the premiere is still three weeks away, the board or radio screams "Sneak preview by email! Hit *#777 on your cell phone now!" Excited and curious, the user dials *#777 and SEND. In less than two seconds, a recording says, "Hello, your free Starpound request has been received. If a first-time user, please retrieve your message at starpound.com within 24 hours using your cell phone number as a one-time password. Thank you."

It effectively connects interested customers with sponsors. The user may now continue driving (safely), and get to a comfortable location to conveniently call up an email account. An email is waiting, titled "Per Your Request—Sneak Preview of Martin's Movie." The body of the email describes the movie and features a one-click link to a Real-Movie preview on the Web. The email also offers a discount on advance ticket purchases, an opportunity to buy the recently released soundtrack on CD (with a one-click link to a RealAudio preview) and a Coca-Cola! Martin's Movie T-shirt offer.

In addition, the email provides links for:
Show me more like this
This wasn't perfect, make it better
Send this to a friend
The email closes with the following:
Get anonymous private response with Starpound and Powertel!
Customize your account at http://www.poweltel.com Its measurable. Advertising customers can see who responds, what they prefer, if inquiries are followed up via the web or even if actual sales result. End users are recognized by profiles, rather than names, and may actually feel more comfortable giving data about their preferences. Regardless, immediate results are gathered and shared to help everyone get the right message to the right people for the right value. This data is aggregated over time and becomes a unique, invaluable resource to assist in the Customer Relationship management objectives of sponsors.

They come back for more. The happy ending is a reliable, private way for mobile audiences to regularly respond to all kinds of advertising, to conveniently get deals, information and rich experiences. As more billboards, signs, commercials, vehicles, kiosks and other ad media feature Starpound numbers, the mobile population will find yet another advantage of their multi-function devices.

Sponsors will sign a contract allowing monthly use of a specific number or block of numbers in an associated response campaign. These customers will pay a recurring fee for use of the "trigger," as well as a fulfillment fee for delivery of each information request. Pricing will be tiered, allowing for customers to choose between low monthly high fulfillment or high monthly/low fulfillment options to best meet their expected campaign response.

Numeric Code Identification. Starpound will reserve certain numbers for particular services within its business model. Numbers will be classified as National (Vanity) Codes, Regional Codes or Local Codes:

National (Vanity) Codes are all two-digit numbers, as well as all three-digit numbers ending in one or two zeros. These numbers will be reserved for licensing to Fortune 1000 and other large corporate clients who can brand these numbers for use across multiple branded initiatives. Consideration at this point is for customers to sign a 12-month contract for use of the number, and pay per month. Such a contract would average $25,000 per annum with no fulfillment fees.

Regional Codes are all non-vanity three-digit numbers. These will be reserved for applications where capturing longer numbers is difficult (e.g. radio and vehicle advertising).

Local Codes are all four-digit or greater numbers which can be used for applications that are better-suited for such numbers (e.g. billboards and real estate signage).

Revenues will come from Starpound's leveraging of its first-to market advantage against a product management strategy that pushes growth from wireless provider partners, distribution partners and application partners. Revenue opportunities will continue as the company expands the value of its interpreted data and evolves new applications for multiple vertical markets.

Wireless Provider Partnerships. Starpound will build its business model by partnering with wireless providers to obtain carriage of its service in key advertising markets. Wireless providers will realize several benefits from partnering with Starpound:

Additional Revenue—Starpound will offer fee revenue to the providers.

Limited Network Usage—Infrastructure uses the data channel of the wireless spectrum. Therefore, the wireless provider is increasing its average revenue per user (ARPU) without using voice networks that are growing increasingly crowded with each new subscriber.

Enhanced Features Starpound allows an ordinary cell phone to become a "trigger" to Web events and content delivery. This capability provides new reasons to use cell phones and increases the reasons to possess one at all times. Features are available on cell phones of any type.

Unique User Data—Starpound will share intelligence with wireless partners regarding customer activity and usage, since these partners already have relationships with these customers. Partners may utilize such information to offer further revenue-enhancing services.

Reduced User Churn—Wireless providers are increasingly concerned about losing customers to competitors based on price, features, etc. Offering the Starpound solution as part of its plan will attract new users and reduce the risk of losing customers to a "Starpound-enabled" competitor.

Monthly recurring revenue stream is evergreen—The technology allows easy implementation for the sponsor with a monthly recurring fee, and creates a high switching cost to change a sign or ad if they decide to leave prior to the end of their contract. Therefore, the Starpound number will be required throughout the life of the signed contract once the code is established.

Upfront platform costs and low variable cost model allows for increasing profits over time—Once the critical mass of sponsors and consumers is reached, the fixed costs are sufficiently amortized over all users and continue to shrink per user as both bases grow. Additionally, the actual incremental costs of adding new sponsors and consumers are minimal, and therefore the gross margins grow as the business grows.

Actual cost of delivery of the service is very low—Once the platform is built, the incremental costs of delivering the service are less than pennies per consumer or sponsor. The system will scale very easily and can service a large number of customers.

Will be rolled out regionally on a DMA (advertising area) basis—The infrastructure does not inhibit scaled rollouts and can be introduced as quickly or as slowly as required by market conditions.

Only requires 1-2 major wireless partners to trial—Since customer education will be in partnership with the wireless providers, the consumer trials can be tailored to support the customer bases of those providers. Wireless subscribers from other networks will not have knowledge of Starpound codes and will not respond.

Only requires a handful of major sponsors to trial—With a handful of key sponsors and strong promotion programs, market trials can be limited to one geography, limited user population, and a handful of strategically placed signs to test viability without jeopardizing large scale deployment.

This business can quickly create barriers to entry for competitors—By creating an exchange for relationships, the barriers to entry will quickly scale due to the diminishing market need for subsequent entrants.

Similar to older business models, such as fax-on-demand, tradeshow literature fulfillment, magazine ad response cards, and email response—This business model is an improvement of existing successful businesses, using new technology to capitalize upon a market opportunity. By leveraging knowledge of those businesses, Starpound will minimize the risks associated with market introduction.

Figure 12:
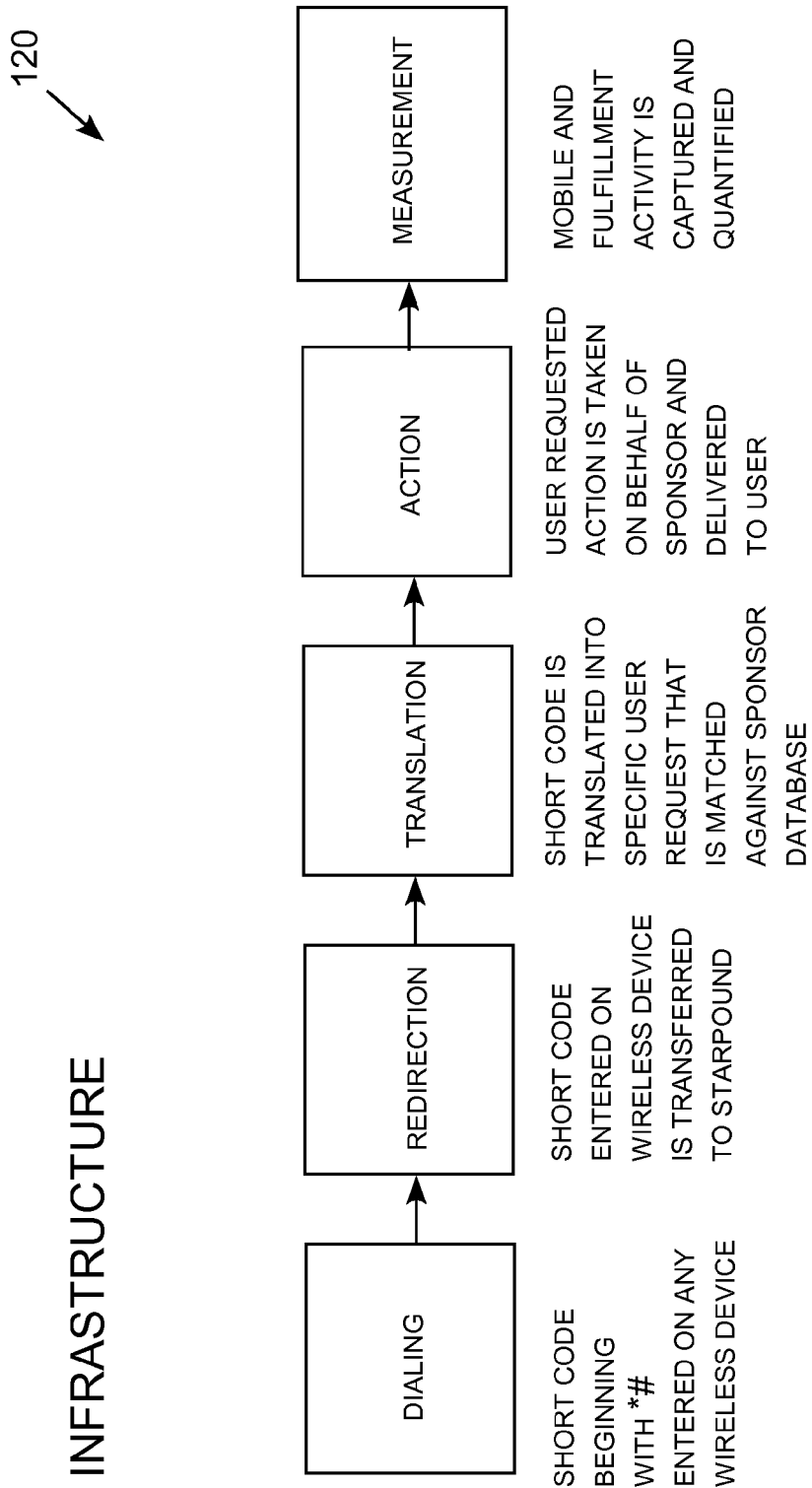
FIG. 12 is a conceptual diagram illustrating the implementation of the telephone initiated data fulfillment system.

FIG. 12 is a conceptual diagram 120 illustrating the implementation of the telephone initiated data fulfillment system. The technology enables mobile users to respond to and retrieve information at their convenience, via the Internet, by entering a simple numeric code on common wireless devices.

Abbreviated Dialing—Users are currently conditioned to input data manually into devices such as phones and PDAs through character entry. Phones specifically use a dialing prefix, e.g., 1 for long distance and 011 for international dialing. Successful routing of information or action requests over a wireless network requires a dialing prefix or data "header." The system developers have chosen *# (a double-function key prefix) specifically so that the dialing prefix or data header is simple and effective. This prefix does not require wireless providers to manage a complicated list of codes, since the technology enables access from under-utilized function keys or characters. This unique method of double-function key input provides Starpound the flexibility to assign codes across all carriers.

User Configuration—The technology offer precise control over how information is requested, when it is received, and in what format it is received. This is accomplished through a web page that users may modify at their convenience.

Redirection.

Storing Information Request—A wireless service provider enables the switches on their network with Starpound, to store the user-entered code and place it in a database record. This includes the location and input information. This does not require a user to complete a time-consuming call or surf though confusing menus. Enabling of switches also supports user email from any device, including two-way pagers or PDAs.

Forwarding Information Request—Enabled switches on a wireless service provider's network will send information in forwarded data records to Starpound servers. Forwarded information will be matched against a database of user profiles and preferences.

User Recognition

Pre-registration—A user must specify a destination and delivery method in order to complete a request. At a minimum, the process requires a user's cell phone number or device ID, and delivery instructions to a set location. In Phase 1 of product launch, delivery choices include email or web postings. Starpound acquires this information from wireless providers (through opt-in permission granted by customers), company registration efforts, or third-party partners who agree to register their users on the system. The company intends to register as many users as possible in advance of their first request, in order to eliminate wasted time while mobile and to ensure a richer first-time experience.

Registration "on the fly"—Starpound has developed solutions to allow users to register at the time of their first request. In Phase 1, a call back to the user is scheduled upon the first usage from an Interactive Voice Response (NR) system or call center that will enable the user to speak their email address. Phase 2 and beyond will include the ability to instantly determine user registration status and to trigger a real-time registration for new users, via NR and other methods.

Confirmation to User—Users will be provided a notification that the service request has been received. In Phase 1, this is accomplished through an audio prompt that briefly states that the request has been sent, and new users will receive an immediate contact from the system to finalize registration. Phase 2 and beyond will incorporate short messaging (SMS) or an email message directly to a user's device.

Translation

Mapping Codes—For local codes (codes assigned to fixed messages, such as signs), the technology maps multiple wireless service providers' coverage areas to street maps. This provides the ability to correlate an sponsor's message to the exact location of message delivery. A unique code is assigned to that message, which can be entered into a device supported by those carriers. This method enables 10,000 or more codes in each coverage area. For regional and national codes (codes assigned to moving or mobile messages, such as radio ads), a block of numbers are reserved across the region or nationally.

Sponsor Registration—The technology provides a web interface for sponsors (our customers) to set up an account, register a message location, receive a code, arrange payment, and to retrieve reports.

User Request Reconciliation—Users can opt-in by providing additional information in order to benefit from other types of actions or services that may be provided. Additionally collected information may include: phone numbers, alternate email addresses, mailing address, and other accounts to be supported through actions, such as pay-per-view programming and interactive TV.

Action

Email or Web—The technology delivers user-requested, sponsor-specific information, deals and benefits to an email address or to a password-protected web posting.

Sponsor Choice—The technology may also take additional actions on behalf of the user, such as scheduling events, purchasing from an existing account, downloading music or movies, providing coupons, sampling, surveys, or remote account management.

User Choice—Users may uniquely configure how, when, where, and in what priority they want information sent to them or actions taken on their behalf to occur.

Measurement

Mobile Behavior—Response location, times, interactions and request types are plotted to establish patterns and trends that more precisely pinpoint the behaviors of mobile participants.

Response Behavior—Latency, activity, follow-through, redemptions, inquiries, recommendations, suggestions, purchases and more are evaluated based on demographics, trends and market data.

Further Opportunity—Post-marketing, follow-up, retention and intelligence are made available for CRM applications in use by sponsors to further the benefits of the infrastructure.

The technology provides the following:

Omnibus ASP Business Process—the general process of providing Dialing-Redirection—

Translation-Action-Measurement infrastructure to enhance direct response from wireless devices, utilizing Internet-based fulfillment.

One-dial access/purchasing Business Process—Use of a dialed number as a single step to purchase goods and services through Internet-enabled telephones.

Abbreviated dialing—Use of a double-function key entry to activate redirection and translation utilizing wireless switches and remote databases.

User-dialed routing & switching—Application of a code entered by a remote user on a network to initiate redirection of data over a wireless switch without pre-configuration by the user.

Geographic positioning & mapping—Design of an intelligent coordinate system to plot user location, cell tower location, and message location against fixed and random variables Interactive mobile response—The function of using a simplified code, entered on a wireless device, to enable rich media fulfillment via the Internet Individual ID across multiple devices—The function of using a single digit string, beginning with a double function code, to act as a ubiquitous identifier for phone and Internet use.

Universal communication among ID holders—The function of screening and filtering information exchanged among holders of various codes.

Starpound Feature Functionality Overview.

| Function | Feature | Owner | Function |
|---|---|---|---|
| Dialing | Enabling #* on switch | Carrier | Configure switches on network to enable #* dialing |
| | HLR lookup for registration | Carrier | Configure switches to poll HLR for routing based upon special MIN field, registered or not |
| | Transfer to call center | Carrier | Configure Switch and HLR to search external database that if MIN field is not checked as registered, route call to call center |
| | Termination of the call | Carrier | Configure Switch and HLR to search external database that if MIN field is checked as registered, terminate call and play prompt |
| | Configuration of Mediation Devices | Carrier | Configure mediation devices to send records: cell id, MIN, and dialed # |
| | Voice Prompt - confirmation | Carrier | Configure switches in network to play voice prompt confirming request |

-continued

Starpound Feature Functionality Overview.

| Function | Feature | Owner | Function |
|---|---|---|---|
| Redirection | Carrier cell map/database | Carrier | Carrier needs to provide cell database with cell ID, lat/long and est. range of cells |
| | Conxion platform/ Integration Server | *# | Purchase of Conxion mediation device Configure interface to Starpound Platform |
| | API to Mediation Devices | *# | Interface to retrieve records from mediation devices (push vs. pull) |
| | HLR and database registration field | *# | Build database field for registration for HLR lookup |
| Translation | Master Database | *# | Build database to process user requests, match information by user/advertiser/code, trigger action, and update advertiser and user records |
| | Advertiser Database (fields) | *# | Database to store account management, information upload, purchase, and preferences |
| | User Database (fields) | *# | Database store account management, link management, and preferences |
| | Cell map/database | *# | Map wireless provider carrier cell map database and street map to lat/long master database which then can identify which cells are covering the exact location of the ID |
| | Number Assignment database | *# | Build search capability to match available numbers in all of the cells covering the ID |
| | Advertiser Website | *# | Enable account management, information upload, purchase, and preferences |
| Action | User website | *# | Enable account management, link management, and preferences |
| | Email Server | *# | Purchase server Configure to interface to database server |
| | Billing/Reporting | *# | Build billing and reporting programs to track and bill for transactions on the system |
| | Accounting System | *# | Purchase accounting system Set up chart of accounts |
| | Credit Card Server | *# | Purchase credit card server Select credit card processor Configure interface to credit card processor |
| | Customer Svc Mgmt | *# | Purchase system Configure to Starpound process requirements |
| Additional | Networking | *# | Select data center, purchase hardware, configure network |

It should be understood that the foregoing relates only to the exemplary embodiments of the present invention, and that numerous changes may be made therein without departing from the spirit and scope of the invention as defined by the following claims.

The invention claimed is:

1. A method for implementing a telecommunications initiated data fulfillment service comprising the steps of:
providing a plurality of item codes, wherein each item code is associated with one or more Internet links;
at a data fulfillment platform, receiving a data message from a telecommunications switch comprising a selected item code and identification information pertaining to a telecommunications device in response to the telecommunications switch receiving a communication from the telecommunications device including a multifunction code and the selected item code;
in response to the data message, transmitting a text message to the telecommunications device comprising at least one of the Internet links associated with the selected item code; and
wherein the step of transmitting the text message to the telecommunications device comprises transmitting a short messaging system (SMS) message to the telecommunications device via the telecommunications switch.

2. The method of claim 1, wherein the Internet link comprises a literal phrase.

3. The method of claim 1, wherein the Internet link comprises a URL.

4. The method of claim 1, further comprising the step of transmitting an email comprising at least one of the Internet links to an address associated with the telecommunications device.

5. The method of claim 4, wherein the step of transmitting the email to an address associated with the telecommunications device comprises the step of transmitting the email to the address without occupying a communications channel between the telecommunications device and the telecommunications switch.

6. The method of claim 1, further comprising the step of delivering an Internet page associated with at least one of the Internet links to the telecommunications device.

7. The method of claim 1, further comprising the steps of:
including receipt of the item code in a response measurement; and
providing the response measurement to a sponsor associated with the item code.

8. The method of claim 1, further comprising the steps of:
receiving location information pertaining to the telecommunications device;
customizing at least one of the Internet links based on the location information; and
delivering the customized link to the telecommunications device via the wireless data channel.

9. The method of claim 8, further comprising the step of including the location information in the response measurement.

10. A method for implementing a telecommunications initiated data fulfillment service comprising the steps of:
providing a plurality of item codes, wherein each item code is associated with one or more Internet links;
at a data fulfillment platform, receiving a data message from a telecommunications switch comprising a selected item code and identification information pertaining to a telecommunications device in response to the telecommunications switch receiving a communication from the telecommunications device including a multifunction code and the selected item code;
in response to the data message, providing the telecommunications device with at least one of the Internet links associated with the selected item code; and
wherein the step of providing the telecommunications device with at least one of the Internet links associated with the selected item code comprises transmission of one or more of the Internet links via a wireless data channel without occupying a voice channel between the telecommunications device and the telecommunications switch.

11. A method for implementing a telecommunications initiated data fulfillment service comprising the steps of:
providing a plurality of item codes, wherein each item code is associated with a sponsor and a data fulfillment response;
at a data fulfillment platform, receiving a plurality of data messages, each data message comprising a selected item code and identification information pertaining to a corresponding telecommunications device in response to the corresponding telecommunications device transmitting a multifunction code and the selected item code to a telecommunications switch;
in response to each data message, providing the data fulfillment response associated with the item code received in the data message comprising transmitting a short messaging system (SMS) message to the telecommunications device via the telecommunications switch;
computing response measurements based on the item codes received in the data messages; and
providing the response measurements to the sponsors associated with the item codes.

12. The method of claim 11, further comprising the steps of:
in each data message, receiving location information pertaining to the corresponding telecommunications device; and
customizing the data fulfillment based on the location information.

13. The method of claim 11, further comprising the steps of:
in each data message, receiving location information pertaining to the corresponding telecommunications device; and
including the location information in the response measurements.

14. The method of claim 11, wherein each data fulfillment response comprises transmission of one or more Internet links associated with the selected item code to the corresponding telecommunications device.

15. The method of claim 11, further comprising the step of customizing the data fulfillment response based on the corresponding telecommunications device or a carrier providing telecommunications service to the corresponding telecommunications device.

16. A method for implementing a telecommunications initiated data fulfillment service comprising the steps of:
providing a plurality of item codes, wherein each item code is associated with a sponsor and an Internet site;
at a data fulfillment platform, receiving a plurality of data messages, each data message comprising a selected item code and identification information pertaining to a corresponding telecommunications device in response to the telecommunications device transmitting a multifunction code and the selected item code to a telecommunications switch;
in response to each data message, providing the corresponding telecommunications device with a link to the Internet site associated with the item code received in the data message;
computing response measurements based on the item codes received in the data messages;
in each data message, receiving location information pertaining to the corresponding telecommunications device;
including the location information in the response measurements; and
providing the response measurements to the sponsors associated with the item codes.

17. The method of claim 16, wherein the step of providing the corresponding telecommunications device with a link to the Internet site associated with the selected item code comprises transmission of the link in a short messaging system text message via a wireless data channel.

18. The method of claim 17, further comprising the step of:
customizing the link based on the location information.

19. The method of claim 16, further comprising the step of transmitting a short messaging system (SMS) message to the telecommunications device via the telecommunications switch comprising the link to the Internet site associated with the item code received in the data message.

20. The method of claim 16, further comprising the step of customizing the link based on the corresponding telecommunications device or a carrier providing telecommunications service to the corresponding telecommunications device.

* * * * *